United States Patent
Inoue

(10) Patent No.: US 9,007,442 B2
(45) Date of Patent: Apr. 14, 2015

(54) STEREO IMAGE DISPLAY SYSTEM, STEREO IMAGING APPARATUS AND STEREO DISPLAY APPARATUS

(75) Inventor: Chiaki Inoue, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 792 days.

(21) Appl. No.: 13/323,026

(22) Filed: Dec. 12, 2011

(65) Prior Publication Data

US 2012/0154551 A1    Jun. 21, 2012

(30) Foreign Application Priority Data

Dec. 17, 2010  (JP) ................................. 2010-281256
Nov. 22, 2011  (JP) ................................. 2011-255593

(51) Int. Cl.
*H04N 13/00*  (2006.01)
*H04N 13/02*  (2006.01)

(52) U.S. Cl.
CPC ....... *H04N 13/0022* (2013.01); *H04N 13/0033* (2013.01); *H04N 13/0239* (2013.01)

(58) Field of Classification Search
CPC .......... H04N 13/0022; H04N 13/0033; H04N 13/0239

USPC ...................................................... 348/42, 49
See application file for complete search history.

(56) References Cited

FOREIGN PATENT DOCUMENTS

JP        07-167633 A        7/1995

*Primary Examiner* — Allen Wong
(74) *Attorney, Agent, or Firm* — Rossi, Kimms & McDowell LLP

(57) ABSTRACT

The stereo display apparatus displays parallax images to present a stereo image. The apparatus acquires the parallax images and information on a maximum pixel shift amount and a minimum pixel shift amount of the parallax images, calculates maximum and minimum relative parallax amounts corresponding to the maximum and minimum relative parallax amounts, by using the information on the maximum and minimum pixel shift amounts and a display condition, and determines whether or not at least one of the maximum and minimum relative parallax amounts exceeds a fusional limit criterion value. The apparatus determines whether or not a difference between the maximum and minimum relative parallax amounts exceeds a fusional limit range amount if the at least one of the maximum and minimum relative parallax amounts exceeds the fusional limit criterion value.

20 Claims, 12 Drawing Sheets

# STEREO IMAGE DISPLAY SYSTEM, STEREO IMAGING APPARATUS AND STEREO DISPLAY APPARATUS

BACKGROUND OF THE INVENTION

1. Field of the Invention

The present invention relates to a stereo image display system that performs imaging (image capturing) of an object from viewpoints different from each other to produce and display parallax images having a parallax therebetween.

2. Description of the Related Art

A stereo image display system is conventionally proposed which displays right and left parallax images in a time-sharing manner and introduces light fluxes from the right and left parallax images to observer's right and left eyes in synchronization with timing of the time-shared display to enable observation of a stereo image. Moreover, a stereo image display system is also conventionally proposed which simultaneously displays right and left parallax images by using two polarized lights whose polarizing axes are orthogonal to each other and introduces these polarized lights to observer's right and left eyes through right and left polarizing filters whose polarizing axes are orthogonal to each other to enable observation of a stereo image.

Each of these stereo image display systems has a parallax condition corresponding to a fusional limit over which observers cannot recognize the right and left parallax images as a stereo image but as a double image due to a display principle and human's visual characteristics. The display of the double image due to a parallax exceeding the fusional limit provides a strong feeling of strangeness, fatigue or discomfort to the observers.

Furthermore, a stereo imaging apparatus is conventionally proposed which performs imaging of an object from right and left viewpoints different from each other to produce right and left parallax images having a parallax therebetween. This imaging apparatus assumes a size of a display screen on which the parallax images are displayed and an observing distance (viewing distance) that is a distance from the display screen to an observer, and controls a base length between the right and left viewpoints and a convergence angle from the right and left viewpoints such that the parallax does not exceed the fusional limit.

In addition, Japanese Patent Laid-Open No. 07-167633 discloses a stereo imaging apparatus integrated with a display apparatus. This stereo imaging apparatus calculates a parallax amount between parallax images produced by itself, and calculates a depth position where the stereo image is presented, on the basis of the parallax amount and a display condition of a display apparatus that displays the parallax images. Then, this stereo imaging apparatus adjusts, according to the depth position, a base length and a convergence angle thereof such that the parallax does not exceed the fusional limit of the observer.

However, the fusional limit is significantly changed depending on the size of the display screen and the viewing distance of the display apparatus. Therefore, even though the base length and the convergence angle are controlled according to the assumed display condition as disclosed in Japanese Patent Laid-Open No. 07-167633, a base length or a convergence angle greatly different from that of the assumed display condition causes the parallax to exceed the fusional limit.

Moreover, it is easy to adjust the base length and the convergence angle such that the parallax does not exceed the fusional limit since the stereo imaging apparatus disclosed in Japanese Patent Laid-Open No. 07-167633 is integrated with the display apparatus. However, when displaying the parallax images produced by this stereo imaging apparatus on an external (different) display apparatus, it is difficult to control the base length and the convergence angle such that the parallax does not exceed the fusional limit.

SUMMARY OF THE INVENTION

The present invention provides a stereo image display system, a stereo imaging apparatus and a stereo display apparatus each of which is capable of producing or displaying parallax images whose parallax does not exceed the fusional limit in various display conditions.

The present invention provides as an aspect thereof a stereo image display system including a stereo imaging apparatus configured to perform imaging to produce parallax images having a parallax therebetween, and a stereo display apparatus configured to be capable of displaying the parallax images to present a stereo image. The stereo imaging apparatus includes a corresponding point extraction part configured to extract corresponding points at each of plural portions in the parallax images, a pixel shift amount acquisition part configured to acquire a pixel shift amount between the corresponding points at each of the plural portions, and configured to acquire information on a maximum pixel shift amount and a minimum pixel shift amount among the acquired pixel shift amounts, and an output part configured to output the parallax images and the information on the maximum and minimum pixel shift amounts. The stereo display apparatus includes an information acquisition part configured to acquire the parallax images and the information on the maximum and minimum pixel shift amounts, a relative parallax amount calculation part configured to calculate a maximum relative parallax amount corresponding to the maximum pixel shift amount and a minimum relative parallax amount corresponding to the minimum pixel shift amount, by using the information on the maximum and minimum pixel shift amounts and a display condition, and a fusional limit determination part configured to determine whether or not at least one of the maximum and minimum relative parallax amounts exceeds a fusional limit criterion value, and configured to determine whether or not a difference between the maximum and minimum relative parallax amounts exceeds a fusional limit range amount if the at least one of the maximum and minimum relative parallax amounts exceeds the fusional limit criterion value.

The present invention provides as another aspect thereof a stereo image display system including a stereo imaging apparatus configured to perform imaging to produce parallax images having a parallax therebetween, and a stereo display apparatus configured to be capable of displaying the parallax images to present a stereo image. The stereo imaging apparatus includes a corresponding point extraction part configured to extract corresponding points at each of plural portions in the parallax images, a pixel shift ratio acquisition part configured to calculate a pixel shift ratio between the corresponding points at each of the plural portions, and configured to acquire information on a maximum pixel shift ratio and a minimum pixel shift ratio among the calculated pixel shift ratios, and an output part configured to output the parallax images and the information on the maximum and minimum pixel shift ratios. The stereo display apparatus includes an information acquisition part configured to acquire the parallax images and the information on the maximum and minimum pixel shift ratios, a relative parallax amount calculation part configured to calculate a maximum relative parallax amount corresponding to the maximum pixel shift ratio and a minimum relative parallax amount corresponding to the minimum pixel shift ratio, by using the information on the maximum and minimum pixel shift ratios and a display condition, and a fusional limit determination part configured to determine whether or not at least one of the maximum and minimum relative parallax amounts exceeds a fusional limit criterion value, and configured to determine whether or not a difference between the maximum and minimum relative parallax amounts exceeds a fusional limit range amount if the at least one of the maximum and minimum relative parallax amounts exceeds the fusional limit criterion value.

The present invention provides as still another aspect thereof a stereo imaging apparatus configured to perform imaging to produce parallax images having a parallax therebetween. The stereo imaging apparatus includes a corresponding point extraction part configured to extract corresponding points at each of plural portions in the parallax images, a pixel shift amount acquisition part configured to acquire a pixel shift amount between the corresponding points at each of the plural portions, and configured to acquire information on a maximum pixel shift amount and a minimum pixel shift amount among the acquired pixel shift amounts, and a recording part configured to record the parallax images and the information on the maximum and minimum pixel shift amounts.

The present invention provides as yet still another aspect thereof a stereo display apparatus configured to display parallax images having a parallax therebetween to present a stereo image. The stereo display apparatus includes an information acquisition part configured to acquire the parallax images and information on a maximum pixel shift amount and a minimum pixel shift amount of the parallax images, a relative parallax amount calculation part configured to calculate a maximum relative parallax amount corresponding to the maximum pixel shift amount and a minimum relative parallax amount corresponding to the minimum pixel shift amount, by using the information on the maximum and minimum pixel shift amounts and a display condition, and a fusional limit determination part configured to determine whether or not at least one of the maximum and minimum relative parallax amounts exceeds a fusional limit criterion value, and configured to determine whether or not a difference between the maximum and minimum relative parallax amounts exceeds a fusional limit range amount if the at least one of the maximum and minimum relative parallax amounts exceeds the fusional limit criterion value.

The present invention provides as further another aspect thereof a computer-readable recording medium in which a computer program causing a computer to execute processing is stored. The computer program includes a corresponding point extraction step of extracting corresponding points at each of plural portions in parallax images having a parallax therebetween, a pixel shift amount acquisition step of acquiring a pixel shift amount between the corresponding points at each of the plural portions, and of acquiring information on a maximum pixel shift amount and a minimum pixel shift amount among the acquired pixel shift amounts, and a recording step of recording the parallax images and the information on the maximum and minimum pixel shift amounts.

The present invention provides as further another aspect thereof a computer-readable recording medium in which a computer program causing a computer to execute processing is stored. The computer program includes an information acquisition step of acquiring parallax images having a parallax therebetween and information on a maximum pixel shift amount and a minimum pixel shift amount of the parallax images, a relative parallax amount calculation step of calculating a maximum relative parallax amount corresponding to the maximum pixel shift amount and a minimum relative parallax amount corresponding to the minimum pixel shift amount, by using the information on the maximum and minimum pixel shift amounts and a display condition, a first fusional limit determination step of determining whether or not at least one of the maximum and minimum relative parallax amounts exceeds a fusional limit criterion value, and a second fusional limit determination step of determining whether or not a difference between the maximum and minimum relative parallax amounts exceeds a fusional limit range amount if the at least one of the maximum and minimum relative parallax amounts exceeds the fusional limit criterion value.

The present invention provides as further another aspect thereof a stereo imaging apparatus configured to perform imaging to produce parallax images having a parallax therebetween. The stereo imaging apparatus includes a corresponding point extraction part configured to extract corresponding points at each of plural portions in the parallax images, a pixel shift ratio acquisition part configured to calculate a pixel shift ratio between the corresponding points at each of the plural portions, and configured to acquire information on a maximum pixel shift ratio and a minimum pixel shift ratio among the calculated pixel shift ratios; and a recording part configured to record the parallax images and the information on the maximum and minimum pixel shift ratios.

The present invention provides as further another aspect thereof a stereo display apparatus configured to display parallax images having a parallax therebetween to present a stereo image. The stereo display apparatus includes an information acquisition part configured to acquire the parallax images and information on a maximum pixel shift ratio and a minimum pixel shift ratio of the parallax images, a relative parallax amount calculation part configured to calculate a maximum relative parallax amount corresponding to the maximum pixel shift ratio and a minimum relative parallax amount corresponding to the minimum pixel shift ratio, by using the information on the maximum and minimum pixel shift ratios and a display condition, and a fusional limit determination part configured to determine whether or not at least one of the maximum and minimum relative parallax amounts exceeds a fusional limit criterion value, and configured to determine whether or not a difference between the maximum and minimum relative parallax amounts exceeds a fusional limit range amount if the at least one of the maximum and minimum relative parallax amounts exceeds the fusional limit criterion value.

The present invention provides as further another aspect thereof a computer-readable recording medium in which a computer program causing a computer to execute processing is stored. The computer program includes a corresponding point extraction step of extracting corresponding points at each of plural portions in parallax images having a parallax therebetween, a pixel shift ratio calculation step of calculating a pixel shift ratio between the corresponding points at each of the plural portions, and of acquiring information on a maximum pixel shift ratio and a minimum pixel shift ratio among the calculated pixel shift ratios, and a recording step of recording the parallax images and the information on the maximum and minimum pixel shift ratios.

The present invention provides as further another aspect thereof a computer-readable recording medium in which a computer program causing a computer to execute processing is stored. The computer program includes an information acquisition step of acquiring parallax images having a parallax therebetween and information on a maximum pixel shift ratio and a minimum pixel shift ratio of the parallax images, a relative parallax amount calculation step of calculating a maximum relative parallax amount corresponding to the maximum pixel shift ratio and a minimum relative parallax amount corresponding to the minimum pixel shift ratio, by using the information on the maximum and minimum pixel shift ratios and a display condition, a first fusional limit determination step of determining whether or not at least one of the maximum and minimum relative parallax amounts exceeds a fusional limit criterion value, and a second fusional limit determination step of determining whether or not a difference between the maximum and minimum relative parallax amounts exceeds a fusional limit range amount if the at least one of the maximum and minimum relative parallax amounts exceeds the fusional limit criterion value.

Other aspects of the present invention will become apparent from the following description and the attached drawings.

DESCRIPTION OF THE PREFERRED EMBODIMENTS

Exemplary embodiments of the present invention will hereinafter be described with reference to the accompanying drawings.

Figure 12:
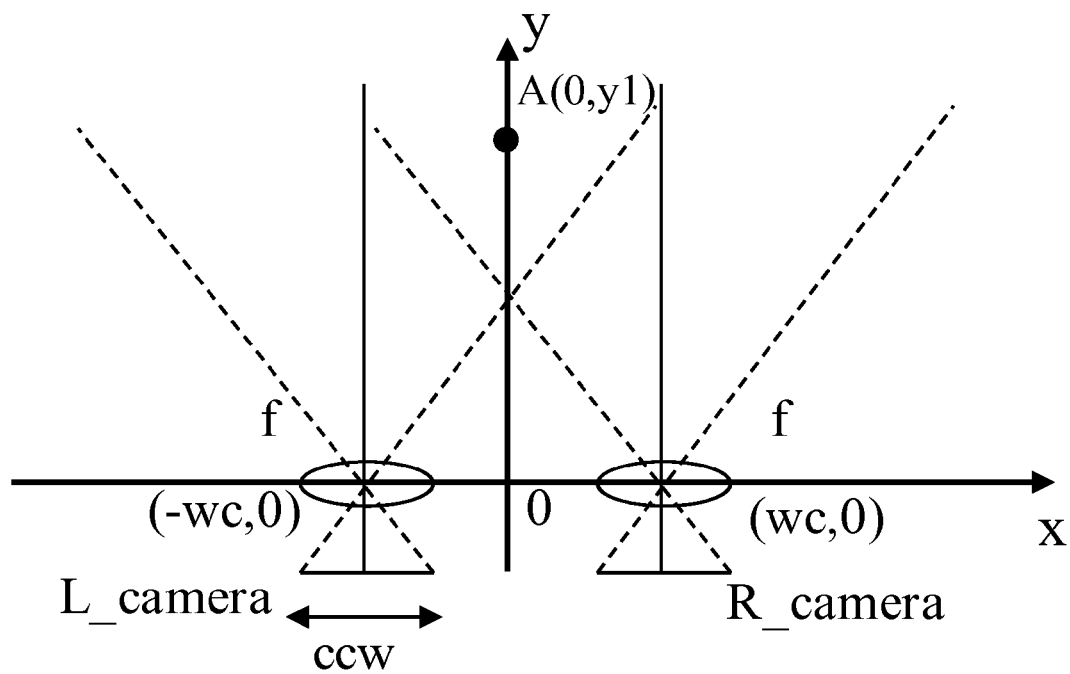
FIG. 12 shows a stereo imaging model.

Prior to description of specific embodiments of the present invention, description of a stereo imaging system, a stereo display system and a fusional limit will be made. FIG. 12 shows a model of the stereo imaging system. In FIG. 12, an origin is set to a center between right and left viewpoints at which right and left cameras are placed, an x axis is set in a horizontal direction, and a y axis is set in a direction of depth (hereinafter referred to as "a depth direction"). A direction of height is omitted for simplification. Moreover, although a method that controls a convergence angle (in other words, a method that tilts imaging optical axes of the right and left cameras) has been conventionally proposed, a principle of a parallel shooting method that arranges the imaging optical axes of the right and left cameras in parallel to each other will be described for simplification. A similar geometric theory also can be applied to the method that controls the convergence angle by taking into consideration a distance to a convergence point.

Coordinates of principal points of imaging optical systems of the right and left cameras are represented by (−Wc, 0) and (Wc, 0). A focal length of the imaging optical systems of the right and left cameras is represented by f. When images of an object A located at a position whose coordinates are (0, y1) on the y axis are imaged by the right and left cameras, displacement amounts (imaging parallaxes) Prc and Plc of the object images from centers of image sensors provided in the right and left cameras can be expressed by the following expressions (1) and (2):

$$Prc = \frac{wx}{y1} \cdot f \qquad (1)$$

$$Plc = -\frac{wx}{y1} \cdot f \qquad (2)$$

According to the above-described principle, capturing the same object from the right and left viewpoints different from each other enables production of right and left parallax images having the displacement amounts (pixels shift amounts) expressed by the expressions (1) and (2) in the horizontal direction.

Figure 13:
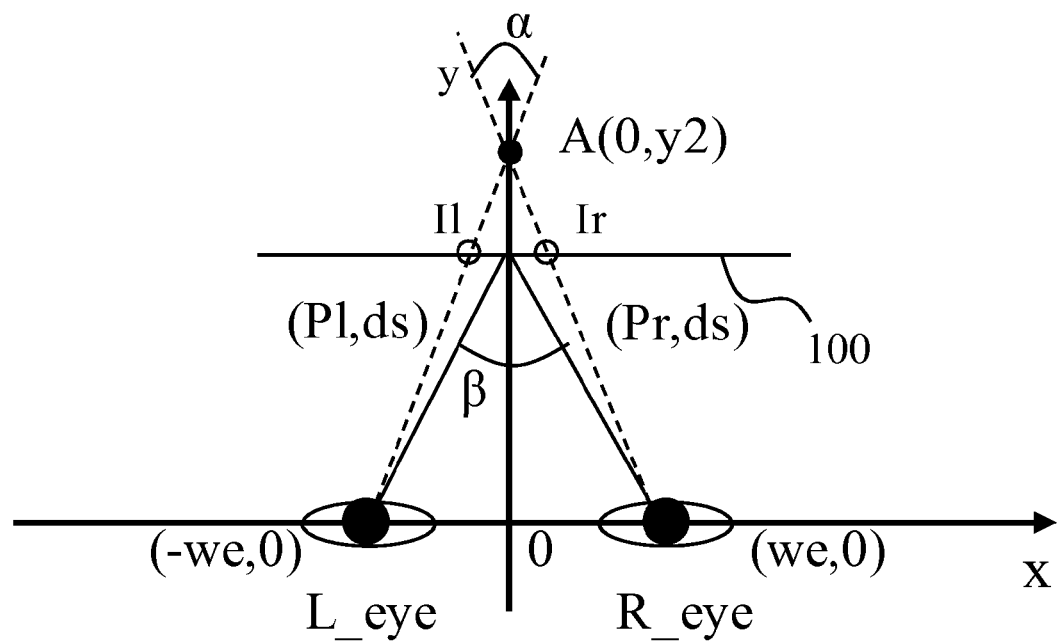
FIG. 13 shows a stereo display model.

Next, description will be made of perception of depth and the fusional limit by using a model of the stereo display system shown in FIG. 13. In FIG. 13, an origin is set to a center between right and left eyes of an observer, an x axis is set in the horizontal direction and a y axis is set in the depth direction. A direction of height is omitted for simplification. A viewing distance that is a distance from the observer to a display screen 100 is represented by ds, and coordinates of the right and left eyes are respectively represented by (−We, 0) and (We, 0). Moreover, coordinates of a position Ir of the object (object image) A in a right parallax image displayed on the display screen 100 are represented by (Pr, ds), and coordinates of a position Il of the object (object image) A in a left parallax image displayed on the display screen 100 are represented by (Pl, ds).

Under such definitions, the observer recognizes that the object A exists at an intersection (0, y2) of a line connecting the right eye (We, 0) with the object position Ir (Pr, ds) in the right parallax image and a line connecting the left eye (−We, 0) with the object position Il (Pl, ds) in the left parallax image. A difference (y2−ds) between the display screen 100 and the intersection (0, y2) in the depth direction corresponds to a distance that the observer stereoscopically recognizes the object A as if the object A exists closer to the observer than the display screen 100 in the depth direction.

The coordinate y2 can be expressed by the following expression (3):

$$y2 = \frac{2we}{2we + Pl - Pr} \cdot ds. \qquad (3)$$

Moreover, this distance (y2−ds) in the depth direction is expressed in terms of angle difference as a relative parallax (α−β) between the object A (0, y2) and the display screen 100

(0, ds), and this size corresponds to a relative distance between the display screen 100 and the object A in the depth direction. From conventional various researches, it is known that humans calculate this angle difference in their brains to recognize a position in the depth direction. An absolute value |α−β| of the relative parallax can be expressed as follows by using the above-mentioned coordinates:

$$|\alpha - \beta| = 2\left|\arctan\left(\frac{w_e}{ds}\right) - \arctan\left(\frac{w_e}{y2}\right)\right| = 2\left|\arctan\left(\frac{\frac{w_e}{ds} - \frac{w_e}{y2}}{1 + \frac{w_e^2}{y2ds}}\right)\right| \quad (4)$$

This expression (4) shows that the relative parallax is an amount depending on the viewing distance ds and the position y2 of the stereo image.

In addition, the position y2 is, as understood from the expression (3), an amount depending on a parallax amount that is a difference between the display positions Pr and Pl of the right and left parallax images and the viewing distance ds, so that the relative parallax (a depth distance recognized by the observer) is an amount depending on the parallax amount (difference between Pr and pl) and the viewing distance ds.

Next, description of the fusional limit will be made. In the above-described stereo display system, although the parallax images are actually displayed on the display screen 100, the observer recognizes that the object A exists at the position y2. That is, the observer's eyes focus on the actually displayed images and the stereo image that the observer recognizes, which are located at mutually different positions. In other words, convergence of the observer's eyes that look at the intersection A cross-eyed and focus adjustment of the observer's eyes that focus on the display screen 100 have a gap. Increase of this gap makes it impossible for the observer to recognize one stereo image from the right and left parallax images, and causes the observer to recognize as a double image. Even if the observer does not recognize the double image, the increase of the gap increases a feeling of fatigue or discomfort.

For example, in a case where the observer looks fixedly at a center of the display screen 100 shown in FIG. 13, the relative parallax (absolute value) at which the observer can comfortably recognize the stereo image is about 1 degree, and the fusional limit is about 2 degrees. That is, the relative parallax (absolute value) exceeding 2 degrees causes the observer to recognize the right and left parallax images as the double image.

Next, description of a representative stereo image display system as a representative embodiment of the present invention will be made. In normal two-dimensional image display, there are a lot of situations that the number of imaging pixels in an imaging apparatus is different from that of displaying pixels in a display apparatus. Especially in still image display systems, whereas the imaging apparatuses provided with an image sensor including 10 million or more imaging pixels are mainly used, display apparatuses are provided with various numbers of displaying pixels such as 300,000 pixels (VGA), two million pixels (Full HD) and eight million pixels (4K or 2K).

In cases where there is a difference between the number of the imaging pixels and that of the displaying pixels, a pixel number conversion process such as down-sampling or up-sampling is generally performed. Moreover, there are various display screen sizes in the display apparatuses such as a several inch display screen for cellar phones and a large display screen exceeding 100 inches for projectors. For such various display screen sizes, in a case where the number of the imaging pixels is same as that of the displaying pixels, it is only necessary to change a display magnification M.

In the stereo display, similarly to the two-dimensional display, it is necessary that high quality stereo images can be displayed under various display conditions. The display of the high quality stereo image means display of a stereo image providing little feeling of discomfort or fatigue to the observer.

However, as understood from the above expressions (3) and (4) showing the depth position of the stereo image, the depth distance to be recognized by the observer is a distance depending on the parallax amount (difference between Pr and Pl) and the viewing distance ds. In other words, in cases of displaying the same parallax images, the parallax amount is changed depending on the display screen size. In addition, the viewing distance at which the observer observes the display screen is unknown. Therefore, it is impossible to calculate the fusional limit without specifying the display screen size of the display apparatus and the viewing distance, which makes it impossible to obtain parallax images corresponding to various display conditions only by controlling the imaging apparatus.

Figure 14:
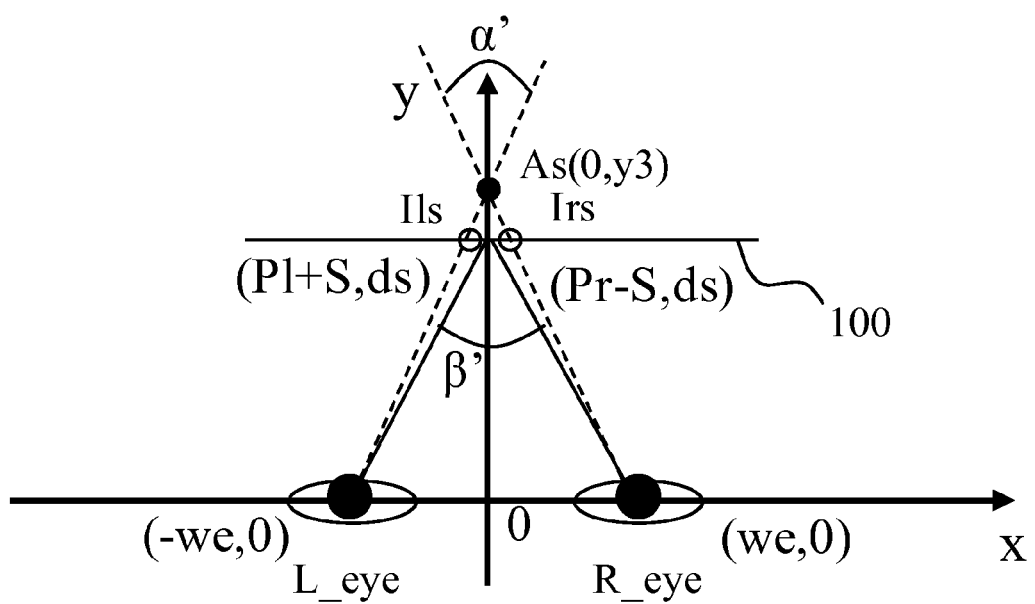
FIG. 14 shows offset control of the stereo display model.

Thus, for the display apparatus, consideration will be made of offset control that translates (parallel shifts) the right and left parallax images in the horizontal direction to display the translated parallax images. The offset control will be described with reference to FIG. 14. In FIG. 14, an origin is set to the center between right and left eyes of the observer, an x axis is set in the horizontal direction, and a y axis is set in the depth direction. A direction of height is omitted for simplification. The viewing distance that is the distance from the observer to the display screen 100 is represented by ds, and coordinates of the right and left eyes are respectively represented by (−We, 0) and (We, 0). Moreover, coordinates of a position Irs of an object (object image) As in the right parallax image displayed on the display screen 100 are represented by (Pr−S, ds), and coordinates of a position Ils of the object (object image) As in the left parallax image displayed on the display screen 100 are represented by (Pl+S, ds). S represents an offset amount that is a parallel shift amount of the right and left parallax images in the horizontal direction.

Under such definitions, the observer recognizes that the object As exists at an intersection (0, y3) of a line connecting the right eye (We, 0) with the object position Irs (Pr−S, ds) in the right parallax image and a line connecting the left eye (−We, 0) with the object position Ils (Pl+S, ds) in the left parallax image.

The coordinate y3 can be expressed by the following expression (5) by using the above respective coordinates:

$$y3 = \frac{2we}{2we + Pl - Pr - 2S} \cdot ds. \quad (5)$$

FIG. 14 shows a stereo display state in which the offset amount S is given to the state shown in FIG. 13. In FIG. 14, the position of the stereo image is shifted closer to the display screen 100 by (y2−y3) according to the offset amount S, as compared with the state shown FIG. 13. FIG. 14 shows only the object As. However, when other objects exist in each parallax image, the offset control provides an influence on the entire displayed parallax image, which shifts all stereo object images closer to the display screen 100 approximately by (y2−y3).

As understood from the above description, if FIG. 13 shows a state where the parallax exceeds the fusional limit of the observer, providing the offset amount S to each parallax image makes it possible to control the display of the parallax images such that the parallax does not exceed the fusional limit of the observer. In other words, providing a sensor for detecting the position of the observer (that is, the viewing distance) and a function of performing the offset control to the display apparatus enables display of the parallax images such that the parallax does not exceed the fusional limit in the various display conditions such as various display screen sizes or various viewing distances.

However, it is not necessarily necessary to perform the offset control on all the parallax images to be displayed for stereo display. Thus, first of all, it is necessary to determine whether or not the offset control should be performed on the displayed parallax images in order to reduce a processing load.

In the case where the display apparatus is provided with the sensor for detecting the position of the observer, information necessary for calculation of the relative parallax to determine whether or not the parallax exceeds the fusional limit is only a maximum parallax amount (Pl−Pr)max and a minimum parallax amount (Pl−Pr)min.

Although the difference between the parallax amounts Pr and Pl has been described in the above principle explanation as a distance, in an actual display apparatus the difference between the parallax amounts Pr and Pl corresponds to a pixel shift amount between corresponding points in the displayed right and left parallax images. Moreover, also in the imaging apparatus, the imaging parallaxes Prc and Plc shown by the expressions (1) and (2) are appeared as a pixel shift amount (Pl−Pr) between corresponding points in captured right and left parallax images. The corresponding points are pixels imaging a same object, that is, pixels corresponding to each other in the right and left parallax images. For example, a positive pixel shift amount (Pl−Pr) causes the observer to recognize the stereo image at a position farther from the observer than the display screen, and a negative pixel shift amount (Pl−Pr) causes the observer to recognize the stereo image at a position closer to the observer than the display screen.

A maximum pixel shift amount between the right and left parallax images output from the imaging apparatus is represented by (Plc−Prc)max, and a minimum pixel shift amount therebetween is represented by (Plc−Prc)min. In addition, the number of imaging pixels in the horizontal direction (hereinafter referred to as "horizontal recording pixels") in each imaging apparatus is represented by Hc, the number of the displaying pixels in the display apparatus is represented by Hm, and a pixel pitch in the display apparatus is represented by T.

Under such definitions, the maximum parallax amount (Pl−Pr)max and the minimum parallax amount (Pl−Pr)min are expressed by the following expression (6). The expression (6) and the following description collectively show the maximum and minimum parallax amounts (Pl−Pr)max and (Pl−Pr)min by (Pl−Pr)max,min, and collectively show the maximum and minimum pixel shift amount (Plc−Prc)max and (Plc−Prc)min by (Plc−Prc)max,min.

$$(Pl - Pr)\text{max, min} = T \cdot \frac{Hm}{Hc} \cdot (Plc - Prc)\text{max, min} \quad (6)$$

Thus, acquisition of information on the number of the recording pixels and information on the maximum and minimum pixel shift amounts of the imaging apparatus enables determination of the fusional limit in the display apparatus, which makes it possible to easily prevent display of the parallax images whose parallax exceeds the fusional limit.

Therefore, each of the following embodiments extracts the corresponding points at plural portions in the right and left parallax images, and adds (records) the information on the maximum and minimum pixel shift amounts that are maximum and minimum ones among the pixel shift amounts between the corresponding points extracted at the plural portions to a header (file header) of a image data file of the parallax image. Instead of the information on the maximum and minimum pixel shift amounts, information on a maximum pixel shift ratio and a minimum pixel shift ratio that are maximum and minimum ones among pixel shift ratios between the corresponding points extracted at the plural portions may be added to the file header. The pixel shift ratio is a ratio of the pixel shift amount between the corresponding points extracted at each of the plural portions to the number of the horizontal recording pixels.

[Embodiment 1]

Figure 1:
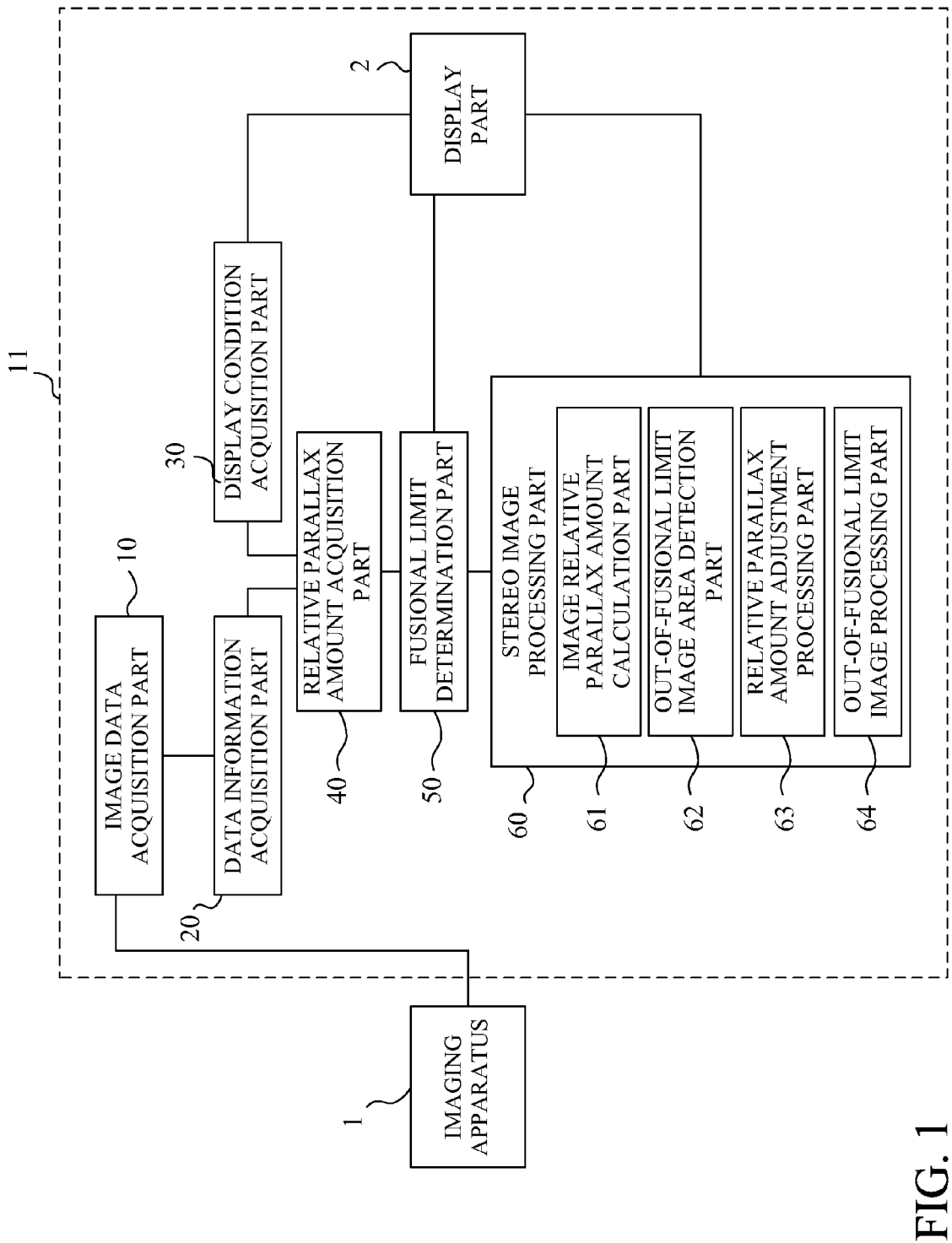
FIG. 1 is a block diagram showing the configuration of a stereo image display system that is Embodiment 1 of the present invention.

FIG. 1 shows the configuration of a stereo image display system that is a first embodiment (Embodiment 1) of the present invention. The stereo image display system of this embodiment produces and displays the right and left parallax images having a parallax therebetween by imaging an object from the mutually different right and left viewpoints.

A stereo imaging apparatus 1 is a video camera capable of imaging the object to produce the right and left parallax images. The right and left parallax images mean a parallax image for observer's right eye and a parallax image for observer's left eye, respectively. A stereo display apparatus 11 is capable of displaying the right and left parallax images on a display part 2 to present a stereo image that can be stereoscopically viewed by the observer.

The imaging apparatus 1 outputs, in order to display the stereo image such that the parallax does not exceed the fusional limit regardless of the display condition such as a display screen size of the display part 2 and the viewing distance, the information on the maximum and minimum pixel shift amounts between the corresponding points extracted at the plural portions with the parallax images.

Figure 3:
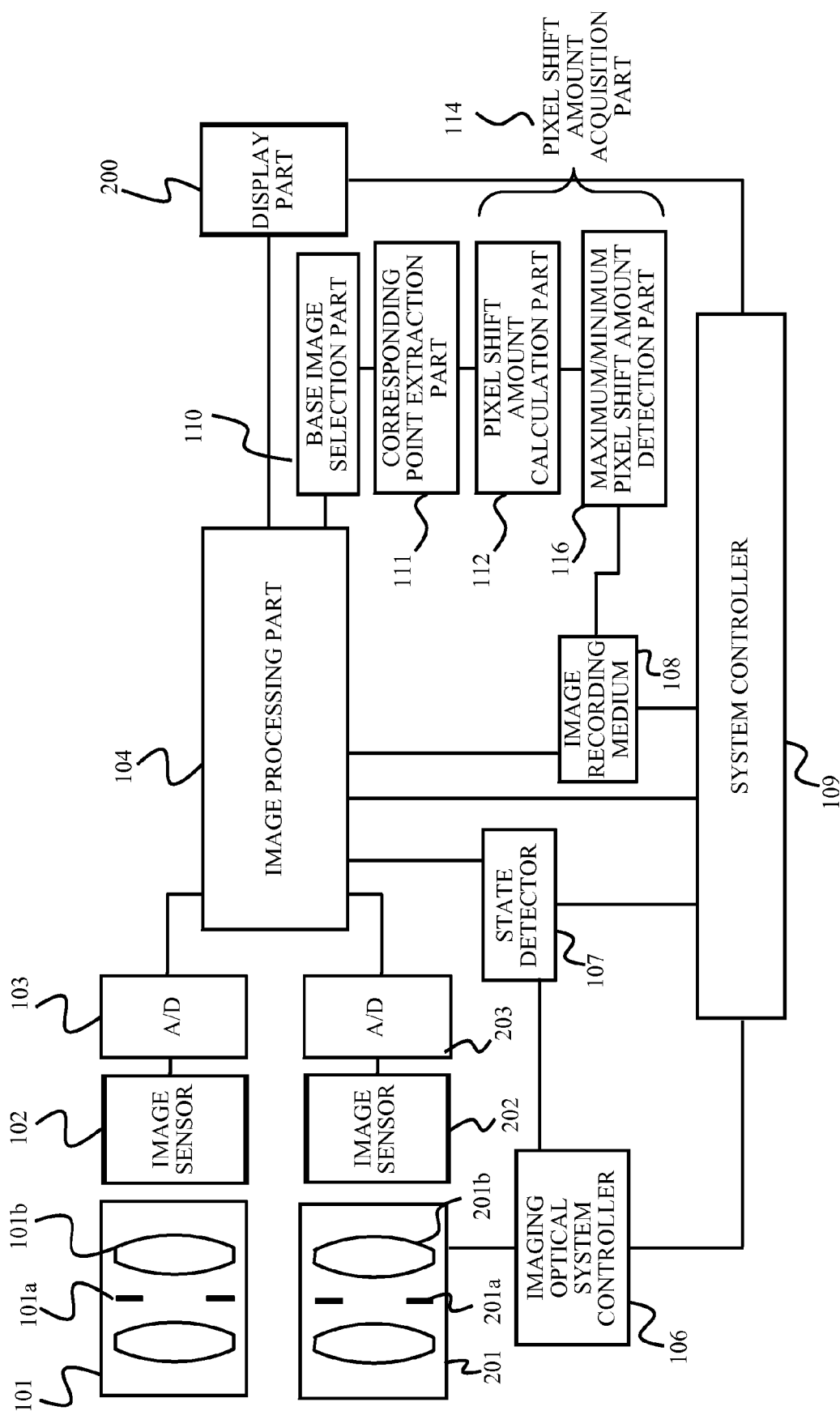
FIG. 3 is a block diagram showing the configuration of a stereo imaging apparatus included in the stereo image display system of Embodiment 1.

FIG. 3 shows the configuration of the imaging apparatus 1. Reference numeral 101 denotes an imaging optical system for the right parallax image, and reference numeral 201 denotes an imaging optical system for the left parallax image. A distance between optical axes of the right and left imaging optical systems 101 and 201, that is, a base length is desirable to be about 65 mm, but is changeable according to demands for a stereoscopic effect of the displayed stereo image.

Right and left image sensors (image pickup elements) 102 and 202 respectively convert optical images of an object (object images) formed by the right and left imaging optical systems 101 and 201 into electric signals (analog output signals). A/D converters 103 and 203 convert the analog output signals from the image sensors 102 and 202 into digital signals, and supply them to an image processing part 104.

The image processing part 104 performs various image processes such as a pixel interpolation process and a color conversion process on the digital signals from the A/D converters 103 and 203 to produce the right and left parallax images as image data. The image processing part 104 calculates a luminance of the object and a focus state of the imaging optical systems 101 and 201 (contrast state of the object image) from the parallax images to supply the calculation results to a system controller 109. The operation of the image processing part 104 is controlled by the system controller 109.

A state detector 107 detects an imaging state such as aperture diameters of aperture stops 101a and 201a provided in the respective imaging optical systems 101 and 201, and positions of focus lenses 101b and 201b provided therein to supply information on the imaging state to the system controller 109. The system controller 109 controls an imaging optical system controller 106 on the basis of the calculation results supplied from the image processing part 104 and the imaging state information supplied from the state detector 107 to change the aperture diameters of the aperture stops 101a and 201a for auto exposure and to moves the focus lenses 101b and 201b for auto focus.

An image recording medium 108 records the right and left parallax images produced by the image processing part 104. Moreover, the image recording medium 108 stores the file header of the image file including the right and left parallax images.

A display part 200 is constituted by a liquid crystal display element and a lenticular lens, the lenticular lens having an optical effect of introducing the right and left parallax images to the observer's right and left eyes, respectively, to present a stereo image.

A base image selection part 110 selects one of the right and left parallax images produced by the image processing part 104 as a base image described below. A corresponding point extraction part 111 extracts the corresponding points, which are the pixels corresponding to each other in the right and left parallax images as described above, at plural portions in the right and left parallax images.

A pixel shift amount calculation part 112 calculates the pixel shift amount between the corresponding points extracted at each of the plural portions by the corresponding point extraction part 111. A maximum/minimum pixel shift amount detection part 116 detects (acquired) the maximum and minimum pixel shift amounts among the pixel shift amounts between the corresponding points calculated at the plural portions by the pixel shift amount calculation part 112 to output information on the maximum and minimum pixel shift amounts to the image recording medium 108.

The pixel shift amount calculation part 112 and the maximum/minimum pixel shift amount detection part 116 constitute a pixel shift amount acquisition part 114. Moreover, the image processing part 104 that outputs the right and left parallax images and the maximum/minimum pixel shift amount detection part 116 that outputs the information on the maximum and minimum pixel shift amounts constitute an output part.

Next, description will be made of an image recording process performed in the imaging apparatus 1 of this embodiment with reference to a flowchart shown in FIG. 4. This process (and processes described below) is executed by the system controller 109 as a computer provided in the imaging apparatus 1 according to a stereo imaging program that is a computer program.

First of all, the system controller 109 starts imaging of the object in response to an input of an imaging start signal generated by a user's operation. At step S101, the system controller 109 controls the imaging optical systems 101 and 201 through the imaging optical system controller 106.

Next, at step S102, the system controller 109 causes the image sensors 102 and 202 to respectively photoelectrically convert the object images formed by the imaging optical systems 101 and 201. Then, the system controller 109 sends the outputs from the image sensors 102 and 202 to the image processing part 104 through the A/D converters 103 and 203, and causes the image processing part 104 to produce the right and left parallax images.

Next, at step S103, the system controller 109 causes the base image selection part 110 to select one of the right and left parallax images as the base image for calculating the pixel shift amount. In this embodiment the base image selection part 110 selects the left parallax image as the base image. However, the right parallax image may be selected as the base image.

Next, at step S104, the system controller 109 causes the corresponding point extraction part 111 to extract the corresponding points from the left parallax image as the base image selected by the base image selection part 110 and from the right parallax image as a reference image. As described above, the corresponding points are points imaging the same object in the right and left parallax images. The corresponding point extraction part 111 extracts the corresponding points at each of the plural portions.

Figure 5:
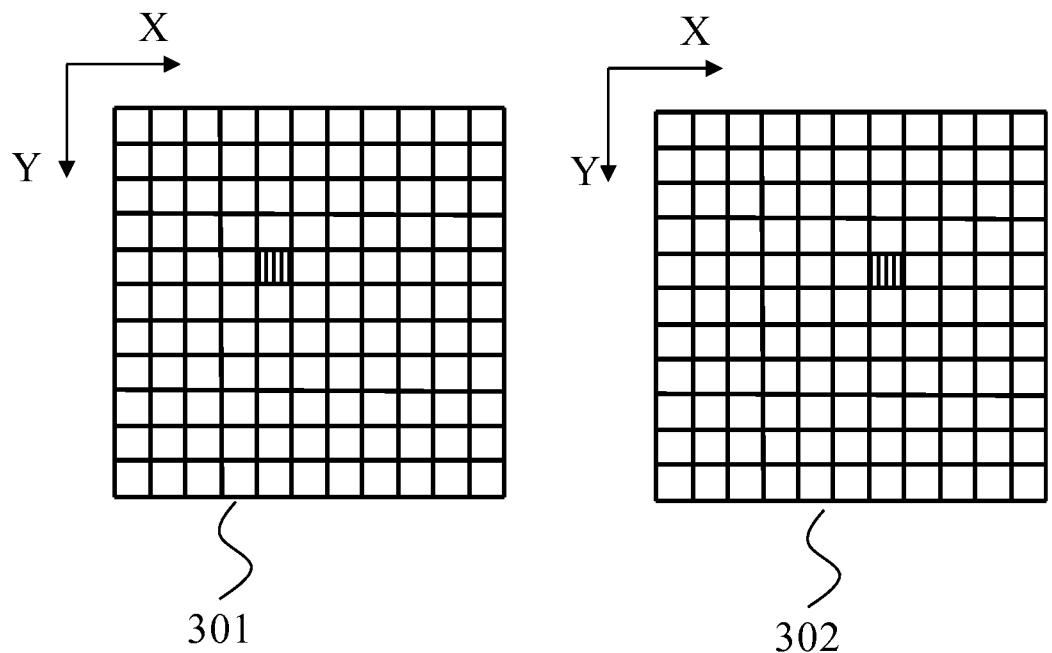
FIG. 5 shows extraction of corresponding points performed in the stereo image display system of Embodiment 1.

Description of a method of extracting the corresponding points will be made with reference to FIG. 5. In this description an X-Y coordinate system is set on the parallax image. In this coordinate system, positions of most left upper pixels in the base image 301 shown on the left side in FIG. 5 and in the reference image 302 shown on the right side therein are defined as origins, an X axis is set in a horizontal direction, and a Y axis is set in a vertical direction. A luminance of a pixel located at coordinates (X, Y) in the base image 301 is represented by F1(X, Y), and a luminance of a pixel located at coordinates (X, Y) in the reference image 302 is represented by F2(X, Y).

A hatched pixel (similar pixel) located at coordinates (X, Y) in the reference image 302 corresponding to a hatched pixel (arbitrary pixel) located at coordinates (X, Y) in the base image 301 is a pixel having a luminance most similar to the luminance F1(X, Y) in the base image 301. However, it is difficult to actually search for such a similar pixel most similar to the arbitrary pixel, so that a block matching process is employed to search for the similar pixel by using pixels arranged in the vicinity of the similar and arbitrary pixels.

For example, description of the block matching process in which a block size corresponds to three pixels will be made. Luminances of the three pixels including the arbitrary pixel located at the coordinates (X, Y) and two pixels neighboring thereto and located at coordinates (X−1, Y) and (X+1, Y) in the base image 301 are as follows:

$F1(X,Y);$ $F1(X-1,Y);$ and $F1(X+1,Y).$

On the other hand, luminances of the three pixels in the reference image 302 respectively shifted from the coordinates (X, Y), (X−1, Y) and (X+1, Y) by k in the X direction, that is, respectively located at coordinates (X+k, Y), (X+k−1, Y) and F2(X+k+1, Y) are as follows:

$F2(X+k,Y);$ $F2(X+k-1,Y);$ and $F2(X+k+1,Y).$

The block matching process defines a degree of similarity E of the pixel located at the coordinates (X+k, Y) in the reference image 302 with respect to the pixel located at the coordinates (X, Y) in the base image 301 by the following expression (7):

$$E = [F1(X, Y) - F2(X + k, Y)] + [F1(X - 1, Y) - \quad (7)$$
$$F2(X + k - 1, Y)] + [F1(X + 1, Y) - F2(X + k + 1, Y)] =$$
$$\sum_{j=-1}^{1} [F1(X + j, Y) - F2(X + k + j, Y)].$$

The process calculates the degrees of similarity E with gradually changing the value of k, and finds a pixel (coordinates (X+k, Y)) providing a smallest degree of similarity E in the reference image 302 as the corresponding point to the pixel located at the coordinates (X, Y) in the base image 301.

The corresponding point may be extracted by using other methods than the block matching, such as a common feature extraction method including edge extraction or the like.

Next, at step S105, the system controller 109 causes the pixel shift amount calculation part 112 to calculate the pixel shift amount (Plc−Prc) between the corresponding points extracted at each of the plural portions. The pixel shift amount is a pixel position difference between the corresponding points in the base and reference images.

Next, at step S106, the system controller 109 causes the maximum/minimum pixel shift amount detection part 116 to detect the maximum pixel shift amount kmax (=(Plc−Prc) max) and the minimum pixel shift amount kmin (=(Plc−Prc) min) among the pixel shift amounts calculated at the plural portions.

Then, at step S107, the system controller 109 causes the maximum/minimum pixel shift amount detection part (recording part) 116 to record the maximum and minimum pixel shift amounts (Plc−Prc)max,min to the above-described file header of the image data file.

At step S108, the system controller 109 records the right and left parallax images produced at step S102 to the image data file as stereo image file.

Figure 6:
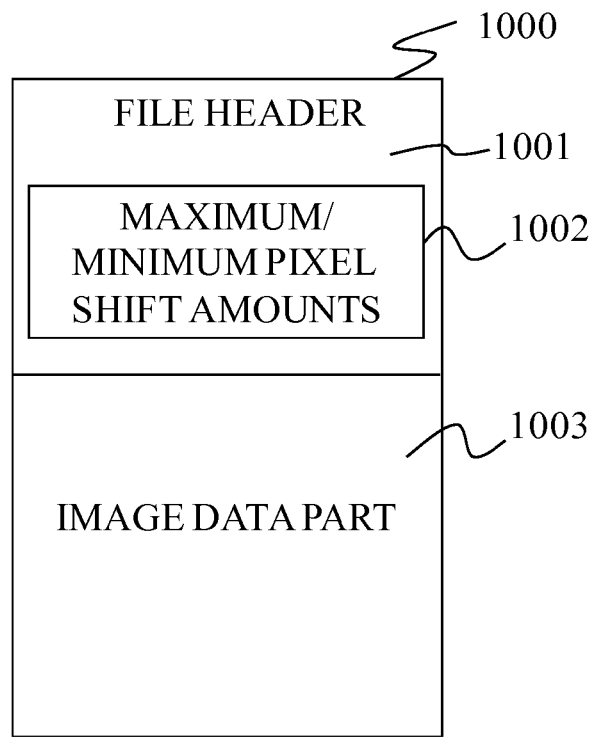
FIG. 6 shows an example of an image data file produced by the stereo image display system of Embodiment 1.

FIG. 6 shows an example of the configuration of the image data file 1000 to be recorded in the image recording medium 108. The image data file 1000 is constituted by a file header 1001 and an image data part 1003. Information 1002 on the above-described maximum and minimum pixel shift amounts (Plc−Prc)max,min is recorded in the file header 1001, and the right and left parallax images are recorded in the image data part 1003. Moreover, various data (imaging information) such as the number of the imaging pixels, an object distance, and an F-number and a focal length of the imaging optical systems are recorded in the file header 1001.

Adding the information on the maximum and minimum pixel shift amounts (Plc−Prc)max,min to the file header of the image data file enables the display apparatus 11 to easily calculate a maximum parallax amount that does not exceed the fusional limit by using the expression (6). As a result, the display apparatus 11 easily determines whether or not the parallax amount exceeds the fusional limit, which can reduce a processing load of the display apparatus 11.

Next, description of the configuration of the display apparatus 11 will be made with reference to FIG. 1. An image data acquisition part 10 acquires the image data file including the parallax images from the imaging apparatus 1. A data information acquisition part 20 acquires the data included in the file header 1001 shown in FIG. 6. A display condition acquisition part 30 acquires information on the display condition (display condition information) in the display part 2. A relative parallax amount acquisition part 40 acquires a relative parallax amount in the parallax images.

A fusional limit determination part 50 performs a fusional limit determination process to determine whether or not the parallax images include image areas (hereinafter collectively referred to as "an out-of-fusional limit image area") whose parallax amount exceeds a range of the fusional limit (hereinafter referred to as "a fusional limit range"). A stereo image processing part 60 is constituted by an image relative parallax amount calculation part 61 that calculates relative parallax amounts in the entire area of the image data and an out-of-fusional limit image area detection part 62 that detects the out-of-fusional limit image area in the image data. In addition, the stereo image processing part 60 includes a relative parallax amount adjustment processing part 63 that performs adjustment of the relative parallax amount of the image data, and an out-of-fusional limit image processing part 64 that performs image processing on the out-of-fusional limit image area.

The display part 2 displays image data output from the stereo image processing part 60. The display part 2 is also constituted by, as well as the display part 200 of the imaging apparatus 1, a liquid crystal display element and a lenticular lens, the lenticular lens having an optical effect of introducing the right and left parallax images to the observer's right and left eyes, respectively, to present a stereo image.

Figure 2:
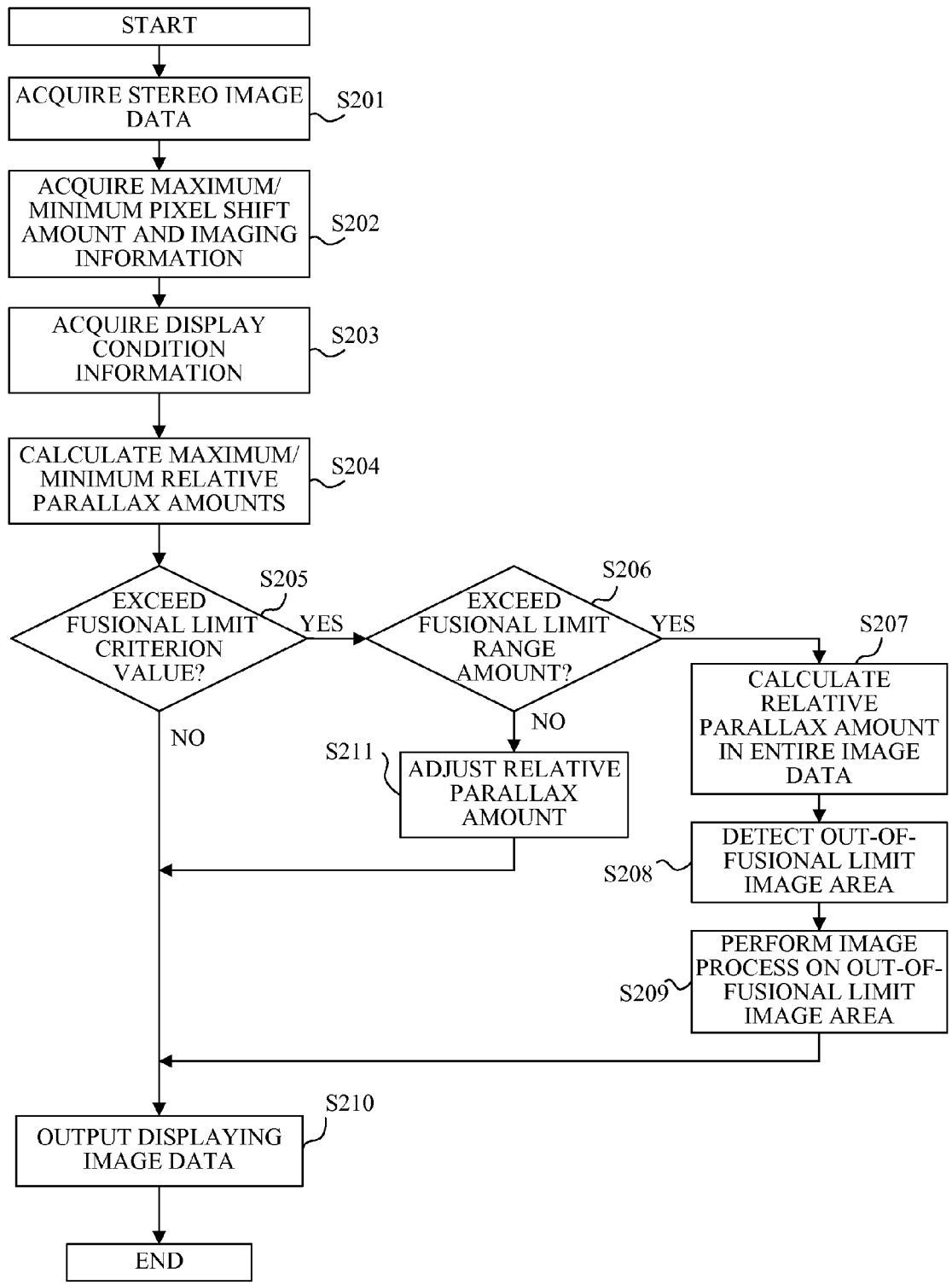
FIG. 2 is a flowchart showing a process performed in the stereo image display system of Embodiment 1.

Next, description of the fusional limit determination process in the stereo image display system of this embodiment will be made with reference to a flowchart shown in FIG. 2.

First of all, at step S201, the image data acquisition part 10 acquires the image data file 1000 from the imaging apparatus 1. The image data file 1000 may be acquired by direct connection between the display apparatus 11 and the imaging apparatus 1 through a USB cable or the like, or by wireless communication using an electric wave or an infrared ray.

Next, at step S202, the data information acquisition part 20 acquires the maximum and minimum pixel shift amounts and the imaging information (such as the object distance and the F-number) included in the file header 1001 of the image data file 1000 acquired by the image data acquisition part 10.

Next, at step S203, the display condition acquisition part 30 acquires the display condition information from the display part 2. The display condition information includes the number of the displaying pixels, the display size and the viewing distance. The display condition information may be acquired by direct connection between the display apparatus 11 and the imaging apparatus 1 through a USB cable or the like, or by wireless communication using an electric wave or an infrared ray.

Next, at step S204, the relative parallax amount acquisition part 40 calculates the maximum and minimum relative parallax amounts in the display apparatus 11 from the above expression (6) by using the maximum and minimum pixel shift amounts, the imaging information and the display condition information.

Next, at step S205 (first fusional limit determination step), the fusional limit determination part 50 determines whether or not at least one of the calculated maximum and minimum relative parallax amounts exceeds a fusional limit criterion value. That is, the fusional limit determination part 50 determines whether or not the input image data includes the out-of-fusional limit image area. The fusional limit criterion value is generally set to ±2 degrees, but is not limited thereto, and may be set to ±1.5 degrees or ±1 degree.

In this embodiment, the fusional limit determination part 50 determines that the out-of-fusional limit image area is included if the maximum relative parallax amount exceeds +2 degrees or the minimum relative parallax amount exceeds −2 degrees. On the other hand, the fusional limit determination part 50 determines that the out-of-fusional limit image area is not included if the maximum and minimum relative parallax amounts do not exceed +2 degrees and −2 degrees, respectively. If determining that the maximum or minimum relative parallax amount in the display apparatus 11 exceeds the fusional limit criterion value step S205, the fusional limit determination part 50 proceeds to step S206.

At step S206 (second fusional limit determination step), the fusional limit determination part 50 calculates a relative parallax amount range of the stereo image by using a difference between the maximum and minimum relative parallax amounts, and determines whether or not the relative parallax amount range exceeds a fusional limit range amount. The fusional limit range amount is an amount of the fusional limit range, such as 4 degrees between +2 degrees and −2 degrees.

If determining that the relative parallax amount range of the stereo image exceeds the fusional limit range amount, the fusional limit determination part 50 proceeds to step S207. For example, when the maximum relative parallax amount is +1.8 degrees and the minimum relative parallax amount is −2.5 degrees, the fusional limit range amount is 4.3 degrees, which is determined to exceed 4 degrees that is the fusional limit range amount.

At step S207, the image data file 1000 is sent to the stereo image processing part 60. The stereo image processing part 60 causes the image relative parallax amount calculation part 61 to calculate the relative parallax amounts in the entire area of the image data in the image data file 1000. The relative parallax amount may be calculated by, for example, the above-described block matching method.

Next, at step S208, the out-of-fusional limit image area detection part 62 detects the out-of-fusional limit image area in the image data from the relative parallax amounts in the entire area of the image data.

Next, at step S209, the relative parallax amount adjustment processing part 63 performs a predetermined image process on the image data of the parallax images such that the out-of-fusional limit image area may become an image area included in the fusional limit range or become closer thereto.

In this embodiment, at step S209, the relative parallax amount adjustment processing part 63 performs, on the right and left parallax images, offset control that translates (that is, shifts in parallel) the right and left parallax images in the horizontal direction and displays the translated parallax images. However, since the parallax amount of the parallax images exceeds the fusional limit range amount, it is impossible to meet the fusional limit in the entire areas of the parallax images only by the offset control.

Thus, the out-of-fusional limit image processing part 64 further performs, on the parallax images, a predetermined image process such that the out-of-fusional limit image area of the parallax images may be not recognized by the observer. Specifically, in this embodiment, the out-of-fusional limit image processing part 64 performs an image process to add the blur component on the out-of-fusional limit image area of the parallax images. Such addition of the blur component to the out-of-fusional limit image area makes it possible to cause the observer not to fixedly look the out-of-fusional limit image area, which enables reduction of the observer's feeling of discomfort or fatigue.

The stereo image processing part 60 thus ends its stereo image data process, and sends the processed image data to the display part 2 such that the processed image data is displayed.

Next, description will be made of a process performed in a case where the fusional limit determination part 50 determines that the maximum and minimum relative parallax amounts do not exceed the fusional limit criterion value at step S205. In this case, the image data (parallax images) in the image data file 1000 does not include the out-of-fusional limit image area. In other words, this image data is data of the parallax images allowing display of a stereo image that hardly provides a feeling of discomfort or fatigue to the observer, and therefore it is not necessary to perform, on this image data, an image process for reducing such feeling, such as the above-described offset control and blur addition. Thus, the stereo image processing part 60 directly proceeds to step S210 to send the image data to the display part 2 such that the stereo image is presented.

Next, description will be made of a process performed in a case where the fusional limit determination part 50 determines that the parallax amount of the parallax images does not exceed the fusional limit range amount at step S206. In this case, the image data (parallax images) in the image data file 1000 is data of the parallax images allowing, if the offset control is performed thereon, display of a stereo image that hardly provides a feeling of discomfort or fatigue to the observer. Therefore, at step S211, the relative parallax amount adjustment processing part 63 performs the offset control on the image data such that the out-of-fusional limit image area may become an image area whose parallax amount is within the fusional limit range.

In this case, the parallax amount of the parallax images does not exceed the fusional limit range amount, so that it is possible to meet the fusional limit in the entire image area only by the offset control. In other words, it is not necessary to further perform any image process for changing the image data into image data that hardly provides a feeling of discomfort or fatigue to the observer. Therefore, the stereo image processing part 60 proceeds to step S210 to send the image data to the display part 2 such that the stereo image is presented.

As described above, this embodiment utilizes the information on the maximum and minimum pixel shift amounts added to the file header to enable display of a good quality stereo image that hardly provides a feeling of discomfort or fatigue to the observer, regardless of the display condition in the display apparatus 11.

Moreover, this embodiment can easily calculate the maximum and minimum relative parallax amounts in the display apparatus 11 by using the expression (6), which makes it possible to easily perform the fusional limit determination, thereby enabling reduction of the processing load of the display apparatus 11.

Furthermore, since this embodiment uses both the maximum and minimum relative parallax amounts, it is possible to easily determine how much area an entire display space of the stereo image occupies in a range between relative parallaxes of ±2 degrees, that is, the fusional limit range. Thus, in the case where it is impossible to avoid the parallax amount from exceeding the fusional limit only by the offset control in the display apparatus 11, performing the blur addition as another image process, in addition to the offset control, can meet the parallax amount exceeding the fusional limit.

As a result, it is only necessary to calculate the parallax amount in the entire image by the display apparatus 11 only in a case where the above two determinations determine that the out-of-fusional limit image area is included in the parallax images and the parallax amount exceeds the fusional limit range amount. Therefore, a processing load of the display apparatus 11 performing a process on other image data can be reduced.

Moreover, when the stereo image as a moving image is displayed at 60 or more frames per second, calculating the maximum and minimum pixel shift amounts for each frame image causes a large processing load of the display apparatus 11. Therefore, adding the information on the maximum and minimum pixel shift amounts to each frame image in the image data file 1000 eliminates necessity of display control corresponding to the fusional limit of the display apparatus 11, which makes it possible to reduce the processing load of the display apparatus 11.

In addition, adding the information on the maximum and minimum pixel shift amounts for all the parallax images to the file header of the whole image data file 1000 eliminates necessity of the above-described fusional limit determination for each parallax image, which makes it possible to significantly reduce the processing lord of the display apparatus 11. Moreover, adding the information on the maximum and minimum pixel shift amounts for each of chapters whose scenes are different from each other to the file header enables the fusional limit determination for each scene, which makes it possible to display a higher quality stereo moving image.

This embodiment has described the case where the file header includes the information on the maximum and minimum pixel shift amounts (Plc−Prc)max,min. However, it is not necessarily necessary that the file header include the information on the maximum and minimum pixel shift amounts. For example, it is only necessary that information (Plc−Prc)MAX recorded to the file header as a maximum pixel shift amount satisfy the following condition:

$$0.8 \times (Plc-Prc)\text{max} < (Plc-Prc)\text{MAX} < 1.2 \times (Plc-Prc)\text{max}.$$

On the other hand, it is only necessary that information (Plc−Prc)MIN recorded to the file header as a minimum pixel shift amount satisfy the following condition:

$$0.8 \times (Plc-Prc)\text{min} < (Plc-Prc)\text{MIN} < 1.2 \times (Plc-Prc)\text{min}.$$

The maximum or minimum pixel shift amount (Plc−Prc)MAX or (Plc−Prc)MIN larger than the upper limit of the above condition or smaller than the lower limit thereof makes the displayed stereo image hard to view for the observer.

If the maximum or minimum pixel shift amount in the file header is close to 0.8×(Plc−Prc)max or 0.8×(Plc−Prc)min, the determination criterion of the fusional limit becomes more strict, which enables display of a stereo image more hardly providing a feeling of discomfort or fatigue to the observer. However, if the maximum or minimum pixel shift amount in the file header becomes smaller than 0.8×(Plc−Prc) max or 0.8×(Plc−Prc)min, the number of frame images for which the determination that the process is necessary to be performed thereon is made is increased, which makes it difficult to obtain an effect of reducing the processing load.

On the other hand, if the maximum or minimum pixel shift amount in the file header is close to 1.2×(Plc−Prc)max or 1.2×(Plc−Prc)min, the determination criterion of the fusional limit becomes more lax, the number of frame images for which the determination that the process is necessary to be performed thereon is made is reduced, which makes it possible to reduce the processing load. However, if the maximum or minimum pixel shift amount in the file header becomes larger than 1.2×(Plc−Prc)max or 1.2×(Plc−Prc)min, the number of frame images that present stereo images providing a feeling of discomfort or fatigue to the observer is increased, which makes it difficult to display a good quality stereo image.

In addition to the information on the maximum and minimum pixel shift amounts, information on the pixel shift amounts between the corresponding points calculated at the plural portions may be recorded in the file header or other parts of the image data file.

Moreover, although this embodiment has described the case where the base image selection part 110, the corresponding point extraction part 111, the pixel shift amount calculation part 112 and the maximum/minimum pixel shift amount detection part 116 are processing parts separate from each other, these parts 110, 111, 112 and 116 may be collectively configured as a single part.

[Embodiment 2]

Figure 7:
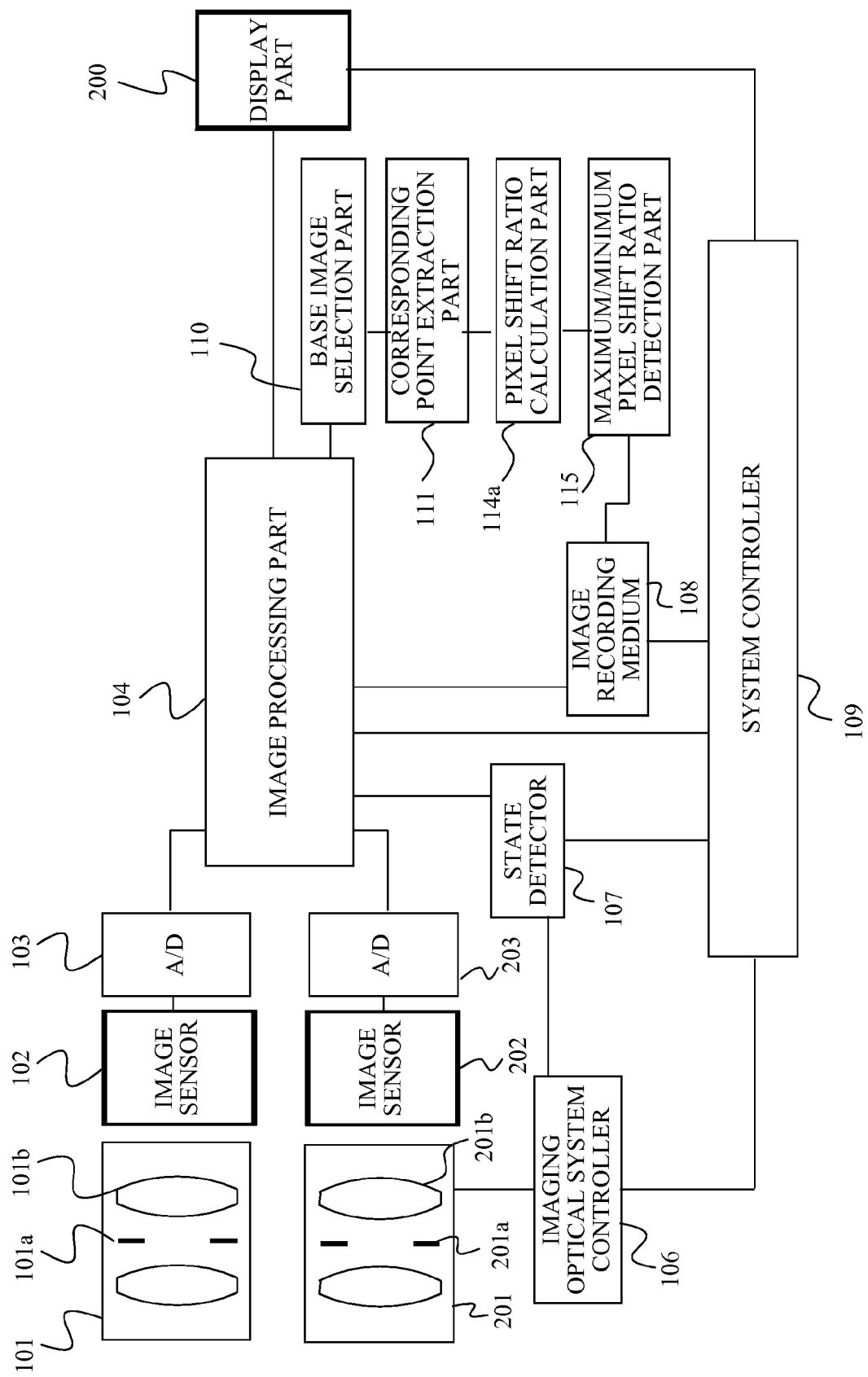
FIG. 7 is a block diagram showing the configuration of a stereo imaging apparatus included in a stereo image display system that is Embodiment 2 of the present invention.

FIG. 7 shows the configuration of a stereo imaging apparatus in a stereo image display system that is a second embodiment (Embodiment 2) of the present invention. Components in this embodiment identical to those in Embodiment 1 (FIG. 3) are denoted by the same reference numerals as those in Embodiment 1, and their description is omitted. The configuration of a stereo display apparatus in this embodiment is same as that in Embodiment 1, and descriptions of the configuration and its operations are omitted.

A pixel shift ratio calculation part 114a calculates the pixel shift amount between the corresponding points extracted at each of the plural portions by the corresponding point extraction part 111, and further calculates the above-mentioned pixel shift ratio that is a ratio of the pixel shift amount between the corresponding points extracted at each of the plural portions to the number of the horizontal recording pixels.

A maximum/minimum shift ratio detection part 115 detects the maximum and minimum pixel shift ratios among the pixel shift ratios between the corresponding points calculated at the plural portions by the pixel shift ratio calculation part 114a, and outputs the information on the maximum and minimum pixel shift ratios to the image recording medium 108. The maximum pixel shift ratio is a value corresponding to (Plc−Prc)max,min/Hc in the expression (6). The pixel shift ratio calculation part 114a and the maximum/minimum shift ratio detection part 115 constitute a pixel shift ratio acquisition part. Moreover, an image processing part 104 outputting the right and left parallax images and a maximum/minimum shift ratio detection part 115 outputting the information on the maximum and minimum pixel shift ratios constitute an output part.

Figure 8:
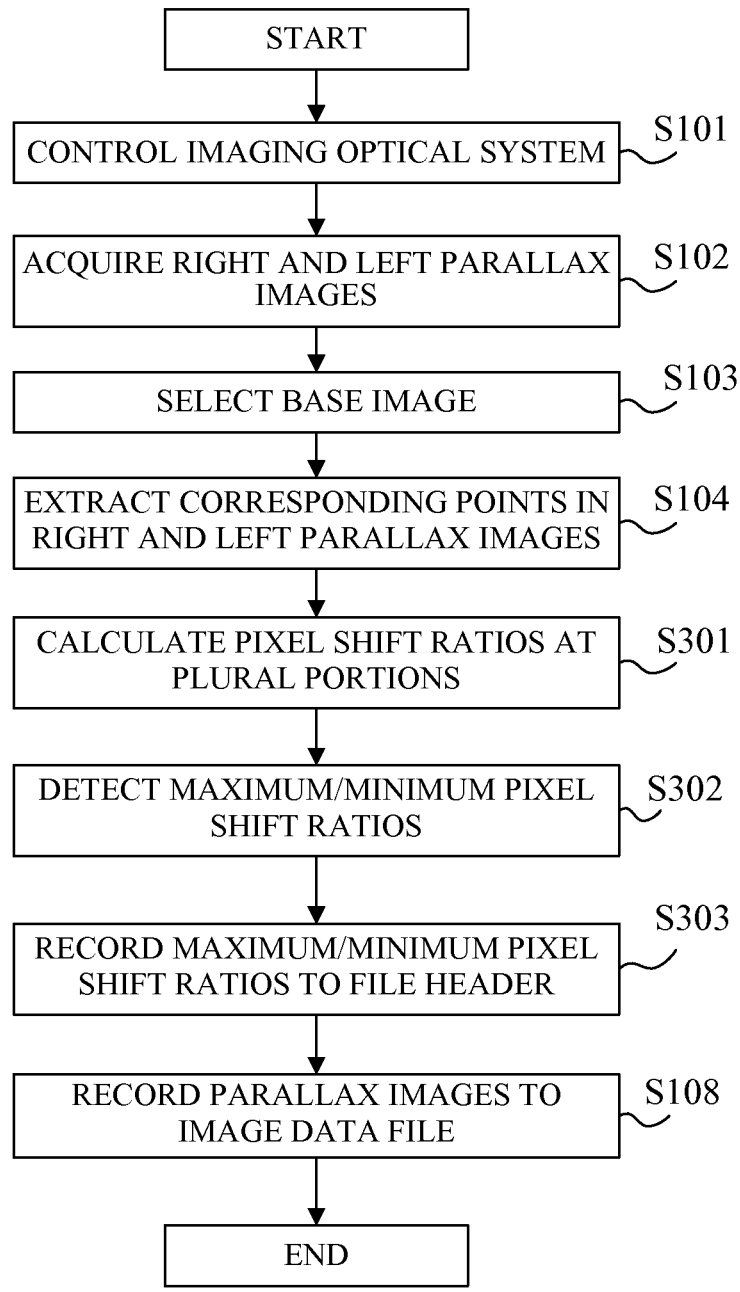
FIG. 8 is a flowchart showing a process performed in the stereo image display system of Embodiment 2.

Next, description of an image recording process performed by the imaging apparatus of this embodiment will be made with reference to a flowchart shown in FIG. 8. This process is executed by the system controller 109 as a computer provided in the imaging apparatus 1 according to a stereo imaging program that is a computer program.

Figure 4:
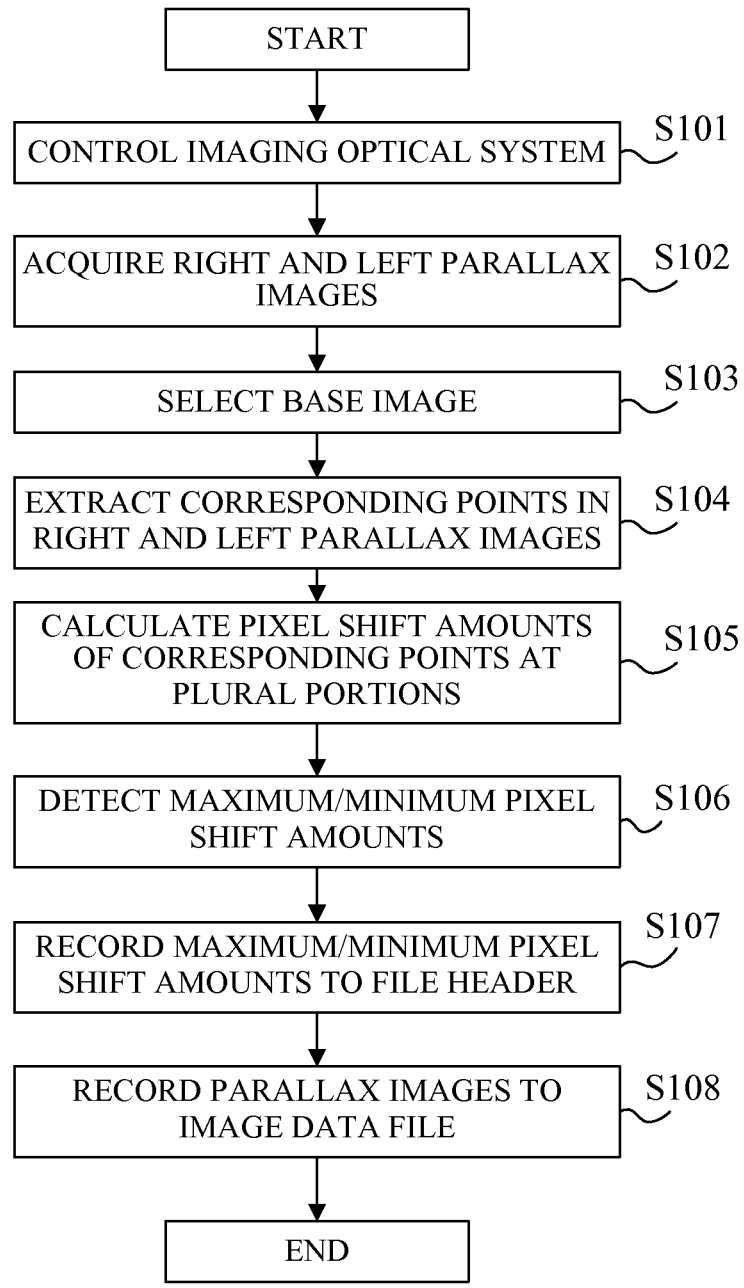
FIG. 4 is a flowchart showing processing performed in the stereo image display system of Embodiment 1.

Steps S101 to S104 and step S108 are same as those in Embodiment 1 (FIG. 4). At step S301, the system controller 109 causes the pixel shift ratio calculation part 114a to calculate the pixel shift ratio between the corresponding points extracted at step S104 at each of the plural portions. The pixel shift ratio calculation part 114a calculates the pixel shift ratio as a ratio ((Plc−Prc)/Hc) of the pixel shift amount (Plc−Prc) between the corresponding points in the base and reference images to the number of the horizontal recording pixels Hc.

Next, at step S302, the system controller 109 causes the maximum/minimum shift ratio detection part 115 to detect the maximum pixel shift ratio (Plc−Prc)max/Hc and the minimum pixel shift ratio (Plc−Prc)min/Hc among the pixel shift ratios between the corresponding points calculated at the plural portions.

Next, at step S303, the system controller 109 causes the maximum/minimum shift ratio detection part 115 to record the information on the maximum and minimum pixel shift ratios (Plc−Prc)max/Hc and (Plc−Prc)min/Hc to the file header of the image data file.

Figure 9:
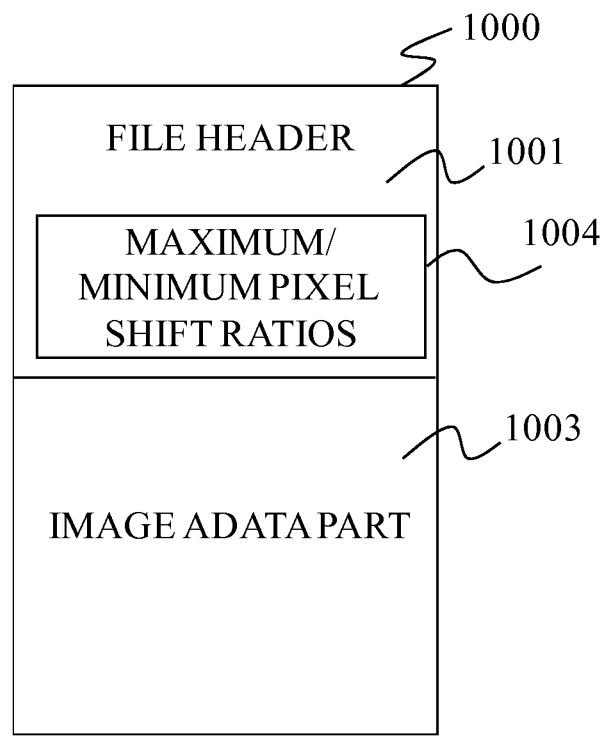
FIG. 9 shows an example of an image data file produced by the stereo image display system of Embodiment 2.

FIG. 9 shows an example of the configuration of an image data file 1000 to be recorded in the image recording medium 108. The image data file 1000 is constituted by the file header 1001 and the image data part 1003, as well as the image data file 1000 described in Embodiment 1. Information 1004 on the above-described maximum and minimum pixel shift ratios (Plc−Prc)max/Hc and (Plc−Prc)min/Hc is recorded in the file header 1001, and the right and left parallax images are recorded in the image data part 1003. Moreover, as in Embodiment 1, the various data (imaging information) such as the number of the imaging pixels, the object distance, and the F-number and the focal length of the imaging optical systems are recorded in the file header 1001.

Adding the information on the maximum and minimum pixel shift ratios (Plc−Prc)max/Hc and (Plc−Prc)min/Hc to the file header of the image data file enables the display apparatus 11 to easily calculate a maximum parallax amount that does not exceed the fusional limit by using the expression (6). As a result, the display apparatus 11 easily determines whether or not the parallax amount exceeds the fusional limit, which can reduce a processing load of the display apparatus 11. In particular, when a stereo image as a moving image is displayed at 60 or more frames per second, calculating the maximum and minimum pixel shift ratios for each frame image causes a large processing load of the display apparatus 11. Therefore, adding the information on the maximum and minimum pixel shift ratios to each frame image in the image data file eliminates necessity of display control corresponding to the fusional limit of the display apparatus 11, which makes it possible to reduce the processing load of the display apparatus 11.

In addition, adding the information on the maximum and minimum pixel shift ratios for all the parallax images to the file header of the whole image data file eliminates necessity of the above-described fusional limit determination for each parallax image, which makes it possible to significantly reduce the processing lord of the display apparatus 11. Moreover, adding the information on the maximum and minimum pixel shift ratios for each of chapters whose scenes are different from each other to the file header enables the fusional limit determination for each scene, which makes it possible to display a higher quality stereo moving image.

Although this embodiment has described the case where the information on the maximum and minimum pixel shift ratios is recorded in the file header of the image data file, information on the pixel shift ratios between the corresponding points extracted at the plural portions may be recorded in the file header or other parts of the image data file, in addition to the information on the maximum and minimum pixel shift ratios.

Moreover, although this embodiment has described the case where the base image selection part 110, the corresponding point extraction part 111, the pixel shift ratio calculation part 114a and the maximum/minimum pixel shift ratio detection part 115 are processing parts separate from each other, these parts 110, 111, 114a and 115 may be collectively configured as a single part.

[Embodiment 3]

Figure 10:
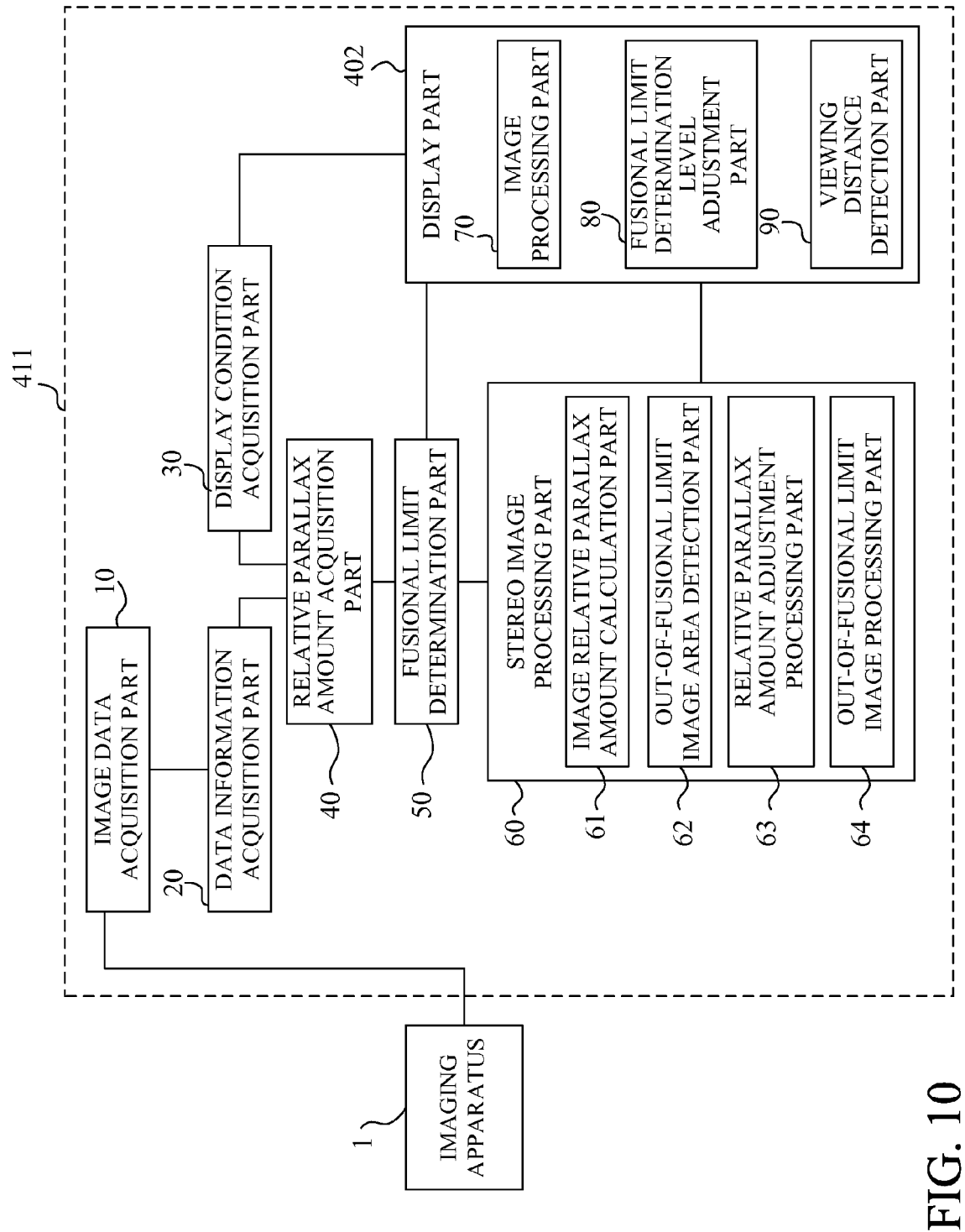
FIG. 10 is a block diagram showing the configuration of a stereo image display system that is Embodiment 3 of the present invention.

Next, description will be made of a stereo image display system that is a third embodiment (Embodiment 3) of the present invention with reference to FIG. 10 showing the configuration thereof. A display part 402 provided in a display apparatus 411 in this embodiment displays right and left parallax images on one display screen in a time-sharing manner, which enables an observer to view a stereo image by observing the display part 402 through glasses provided with right and left liquid crystal shutters that are alternately opened and closed in synchronization with the time-shared display. The display part 402 may simultaneously display the right and left parallax images with polarized lights whose polarization directions are orthogonal to each other. In this case, the observer can view the stereo image by observing the display part 402 through polarization glasses provided with right and left polarization filters that respectively transmit the polarized lights whose polarization directions are orthogonal to each other.

Moreover, the display part 402 includes an image processing part 70, a fusional limit determination level adjustment part 80, and a viewing distance detection part 90. The image processing part 70 performs various image processes such as edge reinforcement and color correction, which are generally performed on two-dimensional images and moving images. The fusional limit determination level adjustment part 80 can set a desired fusional limit determination level in response to an operation of an observer. The viewing distance detection part 90 detects the viewing distance that is the distance from the display screen to the observer. Other components in the stereo image display system are same as those in Embodiment 1.

Figure 11:
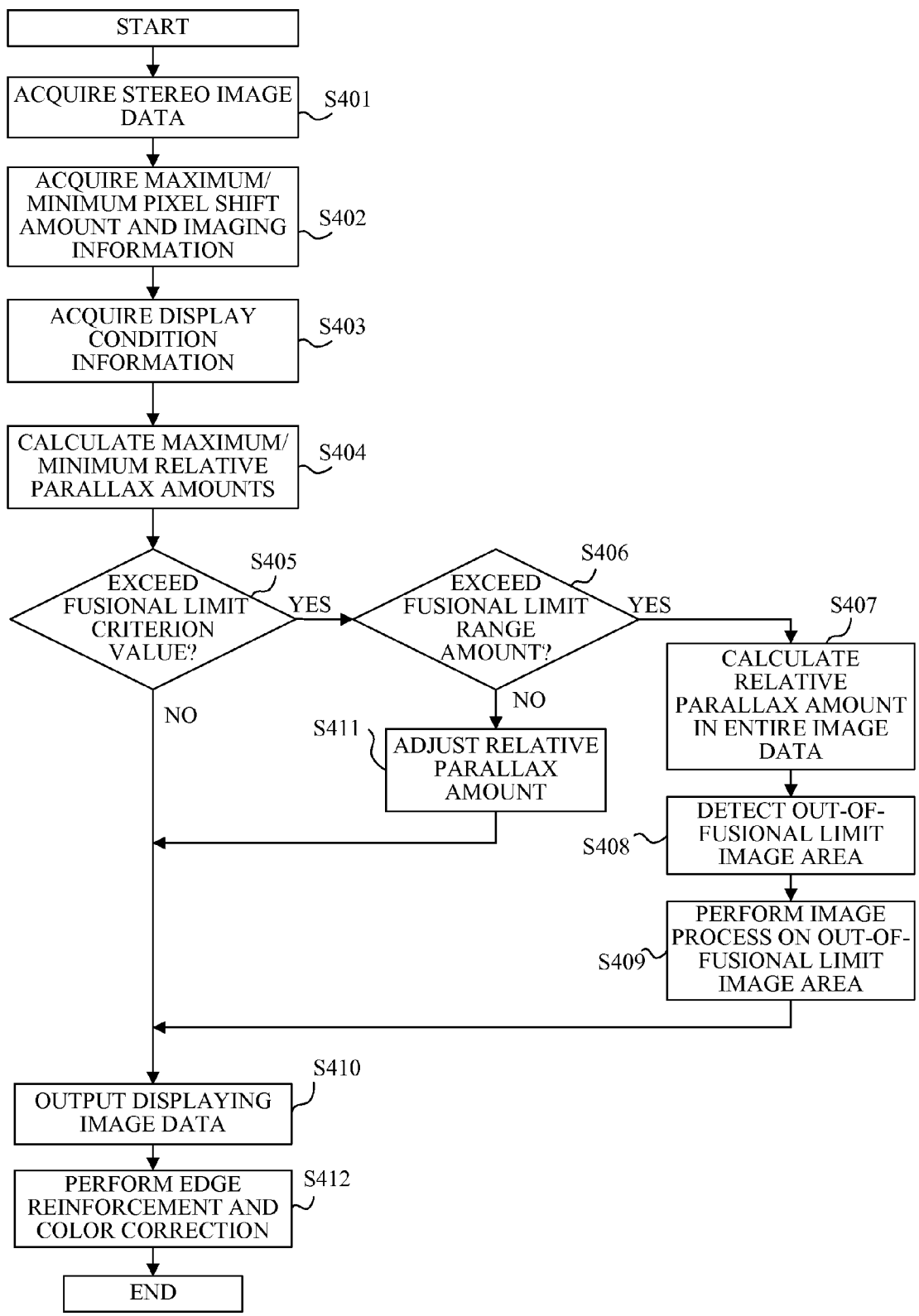
FIG. 11 is a flowchart showing processing performed in the stereo image display system of Embodiment 3.

Next, description of a fusional limit determination process performed in the display apparatus 411 of this embodiment will be made with reference to a flowchart shown in FIG. 11. First of all, at step S401, the image data acquisition part 10 acquires the image data file from the imaging apparatus 1. The image data file may be acquired by the same methods as those described in Embodiment 1.

Next, at step S402, the data information acquisition part 20 acquires the maximum and minimum pixel shift amounts and the imaging information included in the file header of the image data file acquired by the image data acquisition part 10.

Next, at step S403, the display condition acquisition part 30 acquires the display condition information from the display part 402. The display condition information includes, as described in Embodiment 1, the number of the displaying pixels, the display size and the viewing distance. However, in this embodiment, the viewing distance is sent from the viewing distance detection part 90. The display condition information further includes information on the fusional limit determination level sent from the fusional limit determination level adjustment part 80. The display condition information may be acquired by the same methods as those described in Embodiment 1. As to the detection of the viewing distance by the viewing distance detection part 90, a conventional ranging method utilizing reflection of an infrared ray may be used.

Next, at step S404, the relative parallax amount acquisition part 40 calculates the maximum and minimum relative parallax amounts in the display apparatus 411 from the expression (6) by using the maximum and minimum pixel shift amounts, the imaging information and the display condition information.

Next, at step S405, the fusional limit determination part 50 determines whether or not the input image data (parallax images) includes the out-of-fusional limit image area, from the calculated maximum and minimum relative parallax amounts. The fusional limit determination part 50 sets a determination criterion amount to, for example, a relative parallax amount of ±2 degrees, and uses the information on the fusional limit determination level sent from the fusional limit determination level adjustment part 80 as a ratio to the determination criterion amount.

Specifically, the observer selects one of mutually different fusional limit determination levels, and the fusional limit determination part 50 multiplies the determination criterion amount (±2 degrees) by the selected level to control a determination criterion. For example, when the selected level is 80%, the fusional limit determination part 50 sets ±1.6 degrees (±2 degrees×80%) as a new determination criterion. The fusional limit determination part 50 determines whether or not the image data includes the out-of-fusional limit image area.

Subsequent steps S406 to S411 performed until outputting the displaying image data are same as steps S206 to step S211 in Embodiment 1, so that description thereof is omitted. In this embodiment, at step S412, the image processing part 70 performs the above-described image processes such as the edge reinforcement and the color correction on the displaying image data, and then displays it on the display part 402.

As described above, this embodiment can easily calculate the maximum and minimum relative parallax amounts in the display apparatus 411 by utilizing the maximum and minimum pixel shift amount (Plc−Prc)max,min added to the file header and using the expression (6), which makes it possible to easily perform the fusional limit determination, thereby enabling reduction of a processing load of the display apparatus 411.

In particular, when the stereo image as a moving image is displayed at 60 or more frames per second, calculating the relative parallax amount over the entire image data for each frame image causes a large processing load of the display apparatus 411. Therefore, providing the fusional limit determination part 50 to the display apparatus 411 eliminates necessity of causing another processing apparatus to perform the fusional limit determination process that generates a large processing load.

In addition, for example, utilizing the information on the maximum and minimum pixel shift amounts added to the file header of the entire image data file eliminates the process on the whole image data when the fusional limit condition is satisfied, which makes it possible to significantly reduce the processing lord. Moreover, utilizing the information on the maximum and minimum pixel shift amounts for each of chapters whose scenes are different from each other enables the determination process in the display apparatus 411 for each change of the scene, which makes it possible to display a higher quality stereo moving image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-281256, filed on Dec. 17, 2010 and 2011-255593, filed on Nov. 22, 2011, which are hereby incorporated by reference herein in their entirety.

What is claimed is:

1. A stereo image display system comprising:
a stereo imaging apparatus configured to perform imaging to produce parallax images having a parallax therebetween; and
a stereo display apparatus configured to be capable of displaying the parallax images to present a stereo image,
wherein the stereo imaging apparatus comprising:
a corresponding point extraction part configured to extract corresponding points at each of plural portions in the parallax images;
a pixel shift amount acquisition part configured to acquire a pixel shift amount between the corresponding points at each of the plural portions, and configured to acquire information on a maximum pixel shift amount and a minimum pixel shift amount among the acquired pixel shift amounts; and
an output part configured to output the parallax images and the information on the maximum and minimum pixel shift amounts,
wherein the stereo display apparatus comprising:
an information acquisition part configured to acquire the parallax images and the information on the maximum and minimum pixel shift amounts;
a relative parallax amount calculation part configured to calculate (a) a maximum relative parallax amount corresponding to the maximum pixel shift amount and (b) a minimum relative parallax amount corresponding to the minimum pixel shift amount, by using the information on the maximum and minimum pixel shift amounts and a display condition; and
a fusional limit determination part configured to determine whether or not at least one of the maximum and minimum relative parallax amounts exceeds a fusional limit criterion value, and configured to determine whether or not a difference between the maximum and minimum relative parallax amounts exceeds a fusional limit range amount if the at least one of the maximum and minimum relative parallax amounts exceeds the fusional limit criterion value.

2. A stereo image display system according to claim 1, wherein the output part of the stereo imaging apparatus is configured to output information on the pixel shift amount between the corresponding points at each of the plural portions acquired by the pixel shift amount acquisition part.

3. A stereo image display system according to claim 1, wherein the stereo display apparatus further comprising:
an image processing part configured to execute an image process that performs offset control on the parallax images if the fusional limit determination part determines that the maximum and minimum relative parallax amounts exceed the fusional limit criterion value, and configured not to execute the image process if the fusional limit determination part determines that the maximum and minimum relative parallax amounts do not exceed the fusional limit criterion value.

4. A stereo image display system according to claim 1, wherein the stereo display apparatus further comprising:
an image processing part configured to execute a first image process that performs offset control on the parallax images if the fusional limit determination part determines that the maximum and minimum relative parallax amounts do not exceed the fusional limit criterion value, and configured to execute second image process that adds a blur component to the parallax images if the fusional limit determination part determines that the maximum and minimum relative parallax amounts exceed the fusional limit criterion value.

5. A stereo image display system according to claim 1, wherein the display condition is at least one of a number of display pixels, a screen size and a viewing distance of the stereo display apparatus, the viewing distance being a distance from the display apparatus to an observer.

6. A stereo image display system according to claim 1, further comprising:
a viewing distance detection part configured to detect a distance from the display apparatus to an observer.

7. A stereo image display system comprising:
a stereo imaging apparatus configured to perform imaging to produce parallax images having a parallax therebetween; and
a stereo display apparatus configured to be capable of displaying the parallax images to present a stereo image,
wherein the stereo imaging apparatus comprising:

a corresponding point extraction part configured to extract corresponding points at each of plural portions in the parallax images;

a pixel shift ratio acquisition part configured to calculate a pixel shift ratio between the corresponding points at each of the plural portions, and configured to acquire information on a maximum pixel shift ratio and a minimum pixel shift ratio among the calculated pixel shift ratios; and an output part configured to output the parallax images and the information on the maximum and minimum pixel shift ratios, and wherein the stereo display apparatus comprising:

an information acquisition part configured to acquire the parallax images and the information on the maximum and minimum pixel shift ratios;

a relative parallax amount calculation part configured to calculate (a) a maximum relative parallax amount corresponding to the maximum pixel shift ratio and (b) a minimum relative parallax amount corresponding to the minimum pixel shift ratio, by using the information on the maximum and minimum pixel shift ratios and a display condition; and a fusional limit determination part configured to determine whether or not at least one of the maximum and minimum relative parallax amounts exceeds a fusional limit criterion value, and configured to determine whether or not a difference between the maximum and minimum relative parallax amounts exceeds a fusional limit range amount if the at least one of the maximum and minimum relative parallax amounts exceeds the fusional limit criterion value.

8. A stereo image display system according to claim 7, wherein the output part of the stereo imaging apparatus is configured to output information on the pixel shift ratios between the corresponding points at each of the plural portions calculated by the pixel shift ratio acquisition part.

9. A stereo image display system according to claim 7, wherein the stereo display apparatus further comprising:

an image processing part configured to execute an image process that performs offset control on the parallax images if the fusional limit determination part determines that the maximum and minimum relative parallax amounts exceed the fusional limit criterion value, and configured not to execute the image process if the fusional limit determination part determines that the maximum and minimum relative parallax amounts do not exceed the fusional limit criterion value.

10. A stereo image display system according to claim 7, wherein the stereo display apparatus further comprising:

an image processing part configured to execute a first image process that performs offset control on the parallax images if the fusional limit determination part determines that the maximum and minimum relative parallax amounts do not exceed the fusional limit criterion value, and configured to execute a second image process that adds a blur component to the parallax images if the fusional limit determination part determines that the maximum and minimum relative parallax amounts exceed the fusional limit criterion value.

11. A stereo image display system according to claim 7, wherein the display condition is at least one of a number of display pixels, a screen size and a viewing distance of the display apparatus, the viewing distance being a distance from the display apparatus to an observer.

12. A stereo image display system according to claim 7, further comprising:

a viewing distance detection part configured to detect a distance from the stereo display apparatus to an observer.

13. A stereo imaging apparatus configured to perform imaging to produce parallax images having a parallax therebetween, the apparatus comprising:

a corresponding point extraction part configured to extract corresponding points at each of plural portions in the parallax images;

a pixel shift amount acquisition part configured to acquire a pixel shift amount between the corresponding points at each of the plural portions, and configured to acquire information on a maximum pixel shift amount and a minimum pixel shift amount among the acquired pixel shift amounts; and a recording part configured to record the parallax images and the information on the maximum and minimum pixel shift amounts.

14. A stereo display apparatus configured to display parallax images having a parallax therebetween to present a stereo image, the apparatus comprising:

an information acquisition part configured to acquire (a) the parallax images and (b) information on a maximum pixel shift amount and a minimum pixel shift amount of the parallax images;

a relative parallax amount calculation part configured to calculate (a) a maximum relative parallax amount corresponding to the maximum pixel shift amount and (b) a minimum relative parallax amount corresponding to the minimum pixel shift amount, by using the information on the maximum and minimum pixel shift amounts and a display condition; and a fusional limit determination part configured to determine whether or not at least one of the maximum and minimum relative parallax amounts exceeds a fusional limit criterion value, and configured to determine whether or not a difference between the maximum and minimum relative parallax amounts exceeds a fusional limit range amount if the at least one of the maximum and minimum relative parallax amounts exceeds the fusional limit criterion value.

15. A non-transitory computer-readable recording medium in which a computer program causing a computer to execute processing is stored, the computer program comprising:

a corresponding point extraction step of extracting corresponding points at each of plural portions in parallax images having a parallax therebetween;

a pixel shift amount acquisition step of acquiring a pixel shift amount between the corresponding points at each of the plural portions, and of acquiring information on a maximum pixel shift amount and a minimum pixel shift amount among the acquired pixel shift amounts; and a recording step of recording the parallax images and the information on the maximum and minimum pixel shift amounts.

16. A non-transitory computer-readable recording medium in which a computer program causing a computer to execute processing is stored, the computer program comprising:

an information acquisition step of acquiring (a) parallax images having a parallax therebetween and (b) information on a maximum pixel shift amount and a minimum pixel shift amount of the parallax images;

a relative parallax amount calculation step of calculating (a) a maximum relative parallax amount corresponding to the maximum pixel shift amount and (b) a minimum relative parallax amount corresponding to the minimum pixel shift amount, by using the information on the maximum and minimum pixel shift amounts and a display condition;

a first fusional limit determination step of determining whether or not at least one of the maximum and minimum relative parallax amounts exceeds a fusional limit criterion value; and a second fusional limit determination step of determining whether or not a difference between the maximum and minimum relative parallax amounts exceeds a fusional limit range amount if the at least one of the maximum and minimum relative parallax amounts exceeds the fusional limit criterion value.

17. A stereo imaging apparatus configured to perform imaging to produce parallax images having a parallax therebetween, the apparatus comprising:

a corresponding point extraction part configured to extract corresponding points at each of plural portions in the parallax images;

a pixel shift ratio acquisition part configured to calculate a pixel shift ratio between the corresponding points at each of the plural portions, and configured to acquire information on a maximum pixel shift ratio and a minimum pixel shift ratio among the calculated pixel shift ratios; and a recording part configured to record the parallax images and the information on the maximum and minimum pixel shift ratios.

18. A stereo display apparatus configured to display parallax images having a parallax therebetween to present a stereo image, the apparatus comprising:

an information acquisition part configured to acquire (a) the parallax images and (b) information on a maximum pixel shift ratio and a minimum pixel shift ratio of the parallax images;

a relative parallax amount calculation part configured to calculate (a) a maximum relative parallax amount corresponding to the maximum pixel shift ratio and (b) a minimum relative parallax amount corresponding to the minimum pixel shift ratio, by using the information on the maximum and minimum pixel shift ratios and a display condition; and a fusional limit determination part configured to determine whether or not at least one of the maximum and minimum relative parallax amounts exceeds a fusional limit criterion value, and configured to determine whether or not a difference between the maximum and minimum relative parallax amounts exceeds a fusional limit range amount if the at least one of the maximum and minimum relative parallax amounts exceeds the fusional limit criterion value.

19. A non-transitory computer-readable recording medium in which a computer program causing a computer to execute processing is stored, the computer program comprising:

a corresponding point extraction step of extracting corresponding points at each of plural portions in parallax images having a parallax therebetween;

a pixel shift ratio calculation step of calculating a pixel shift ratio between the corresponding points at each of the plural portions, and of acquiring information on a maximum pixel shift ratio and a minimum pixel shift ratio among the calculated pixel shift ratios; and a recording step of recording the parallax images and the information on the maximum and minimum pixel shift ratios.

20. A non-transitory computer-readable recording medium in which a computer program causing a computer to execute processing is stored, the computer program comprising:

an information acquisition step of acquiring (a) parallax images having a parallax therebetween and (b) information on a maximum pixel shift ratio and a minimum pixel shift ratio of the parallax images;

a relative parallax amount calculation step of calculating (a) a maximum relative parallax amount corresponding to the maximum pixel shift ratio and (b) a minimum relative parallax amount corresponding to the minimum pixel shift ratio, by using the information on the maximum and minimum pixel shift ratios and a display condition;

a first fusional limit determination step of determining whether or not at least one of the maximum and minimum relative parallax amounts exceeds a fusional limit criterion value; and a second fusional limit determination step of determining whether or not a difference between the maximum and minimum relative parallax amounts exceeds a fusional limit range amount if the at least one of the maximum and minimum relative parallax amounts exceeds the fusional limit criterion value.

\* \* \* \* \*